Figure 6:
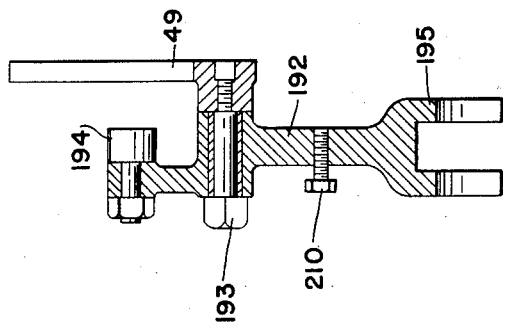

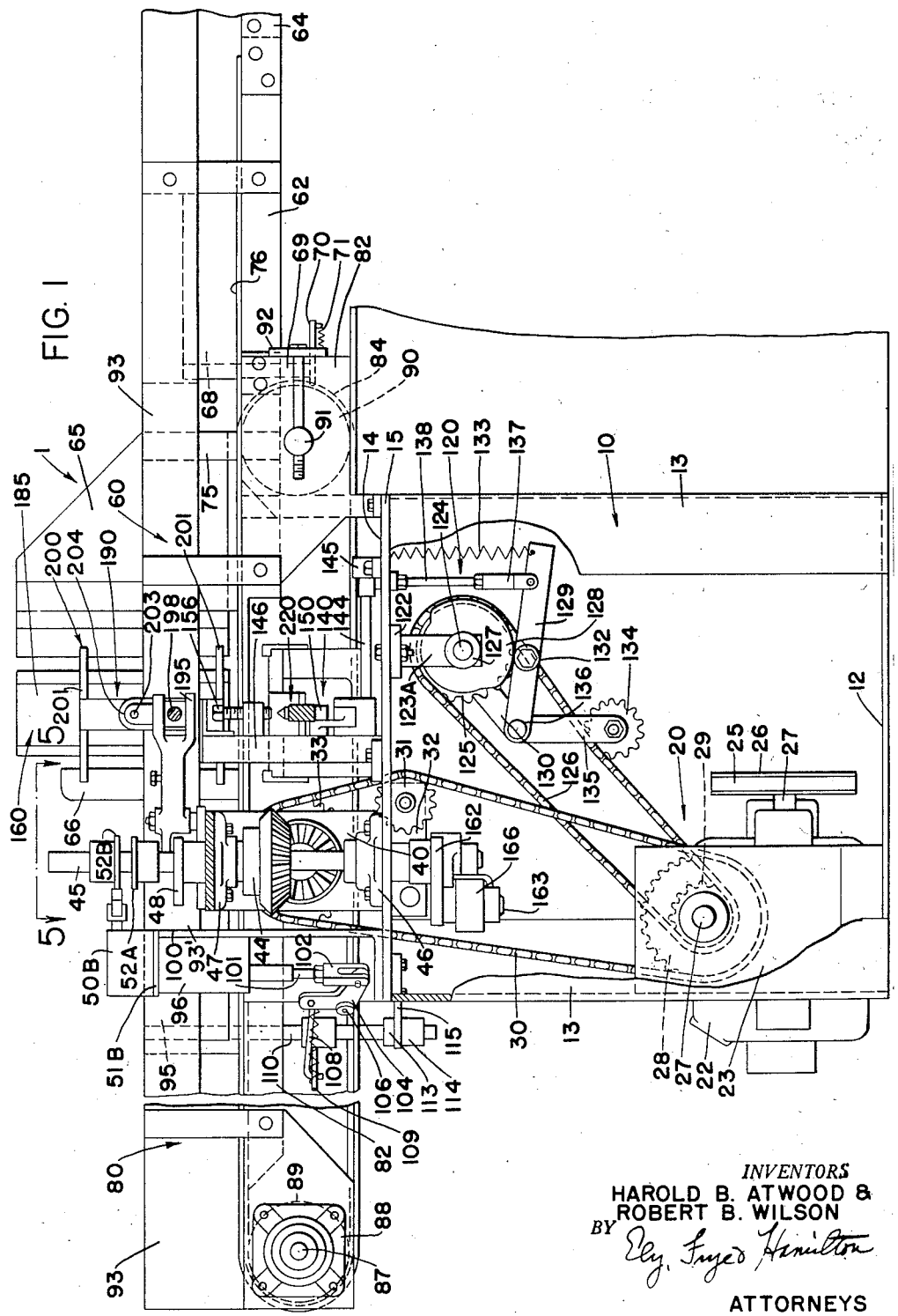

Jan. 7, 1958  H. B. ATWOOD ET AL  2,818,888
METHOD AND APPARATUS FOR CONTINUOUSLY DETECTING
AND CORRECTING LIGHTWEIGHT PACKAGES
Filed April 27, 1955  10 Sheets-Sheet 2
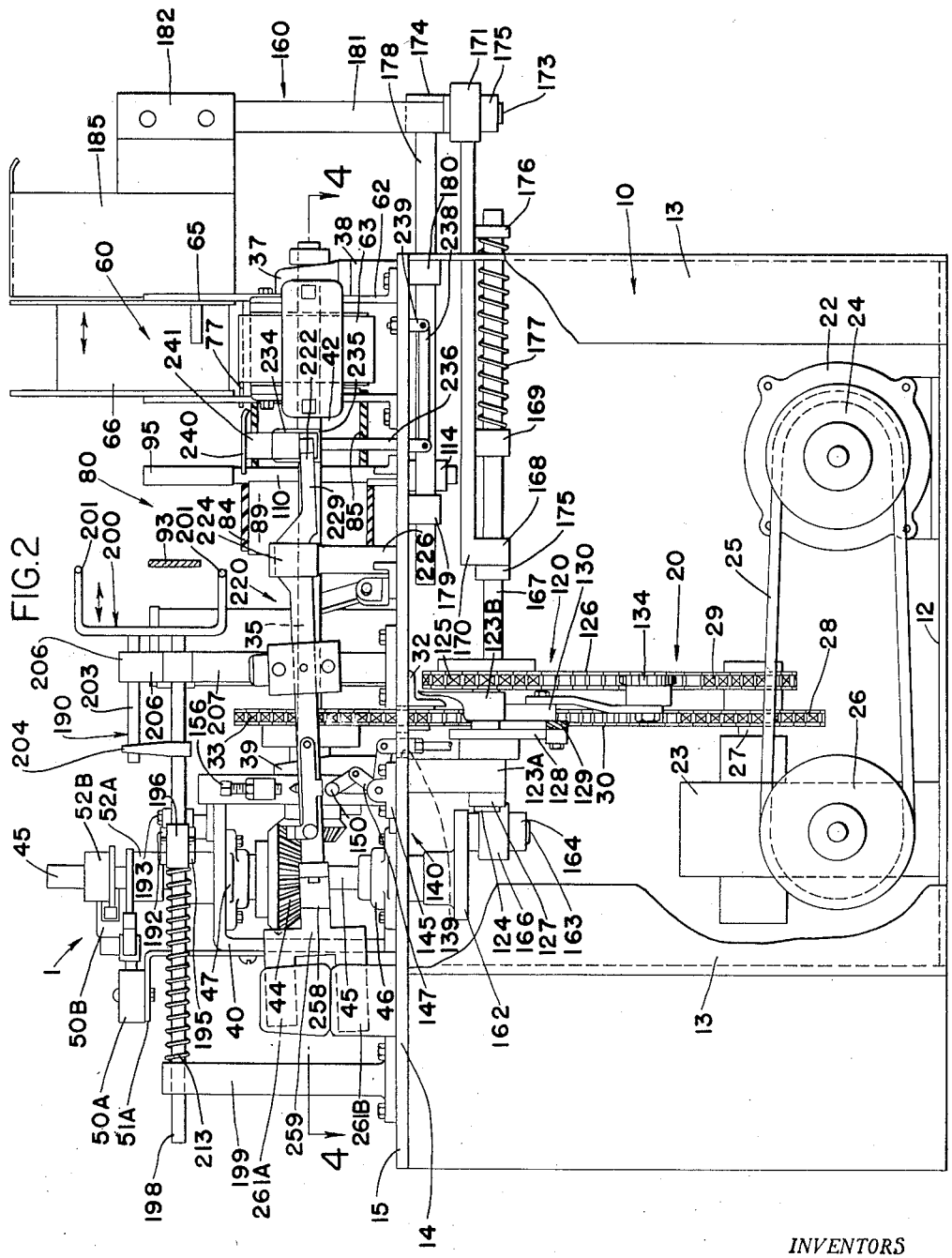
INVENTORS
HAROLD B. ATWOOD &
BY ROBERT B. WILSON
ATTORNEYS

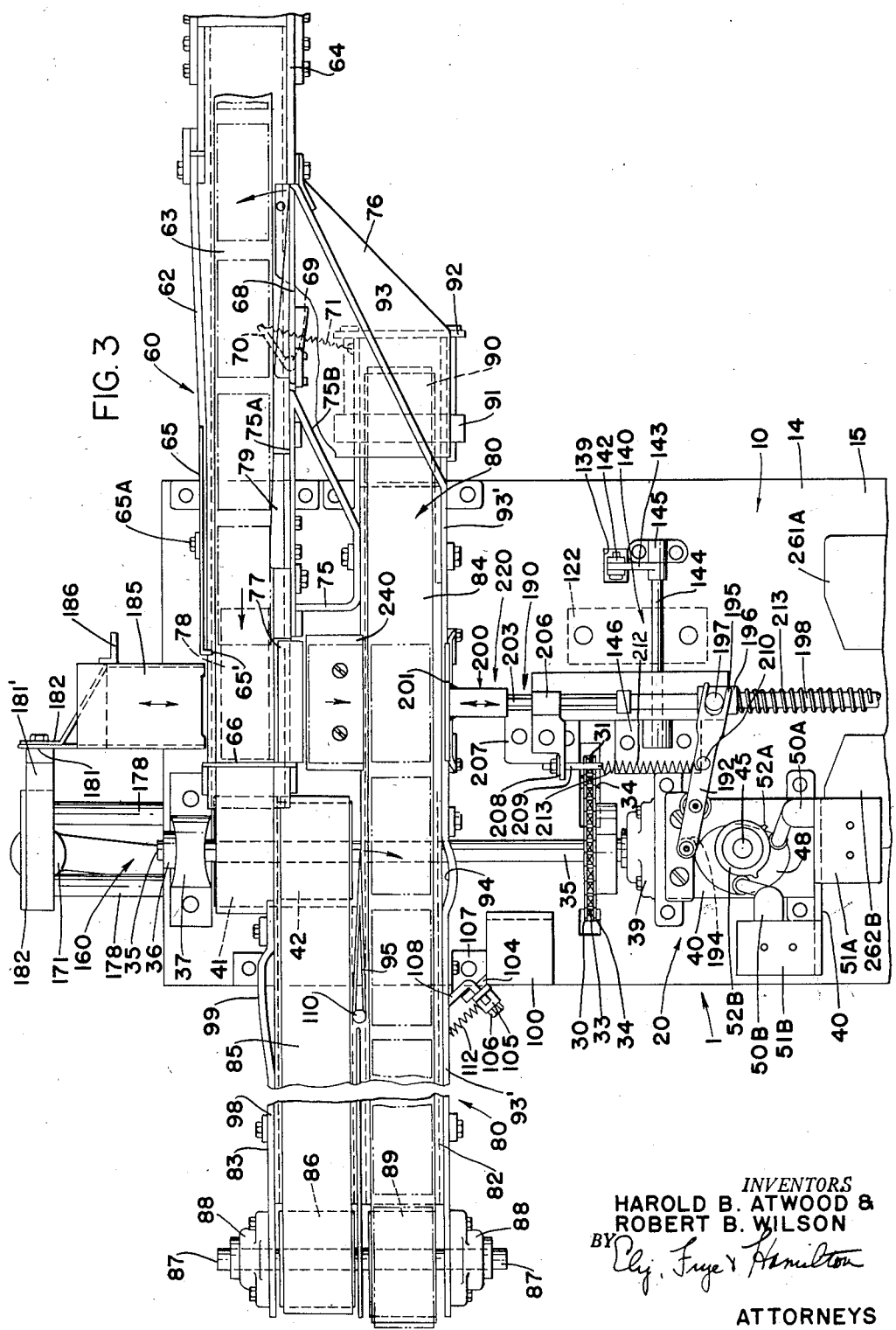

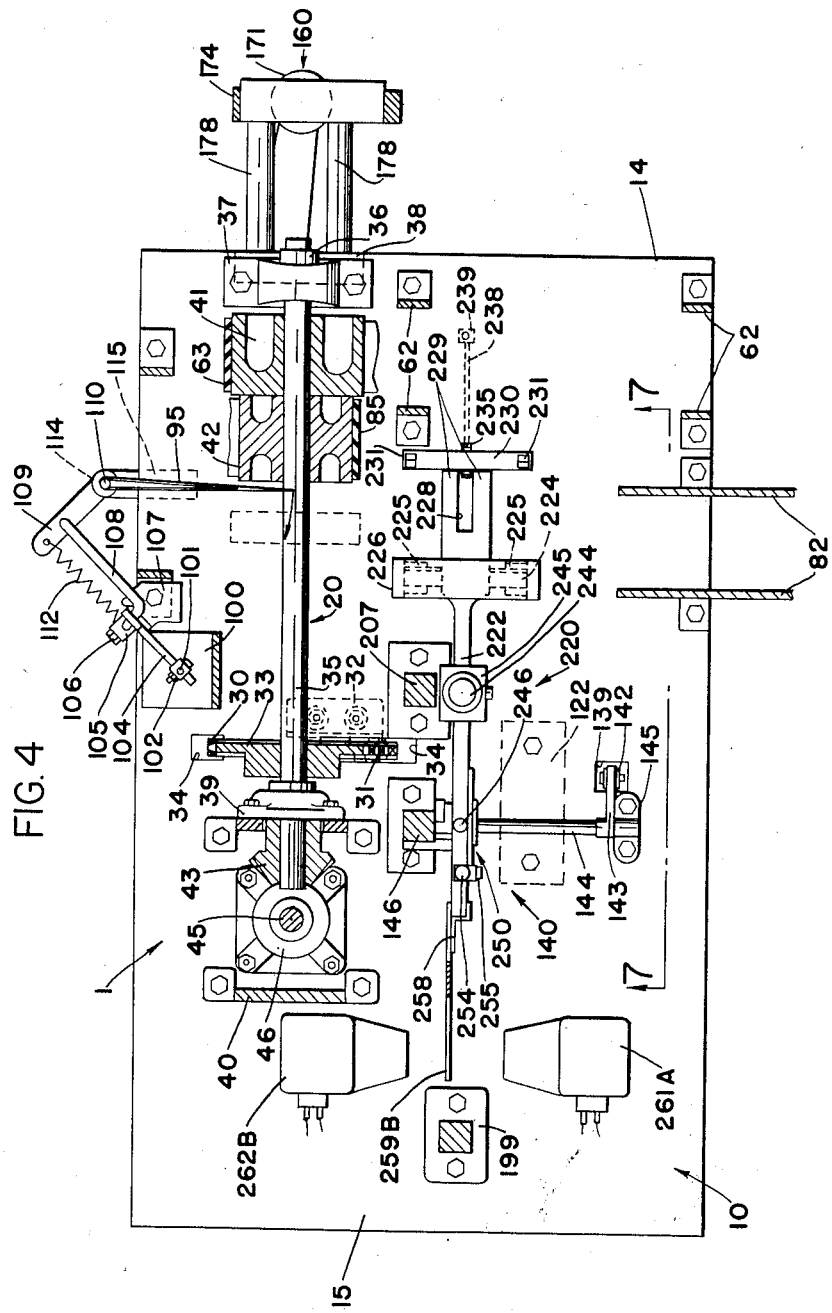

INVENTORS
HAROLD B. ATWOOD &
ROBERT B. WILSON

ATTORNEYS

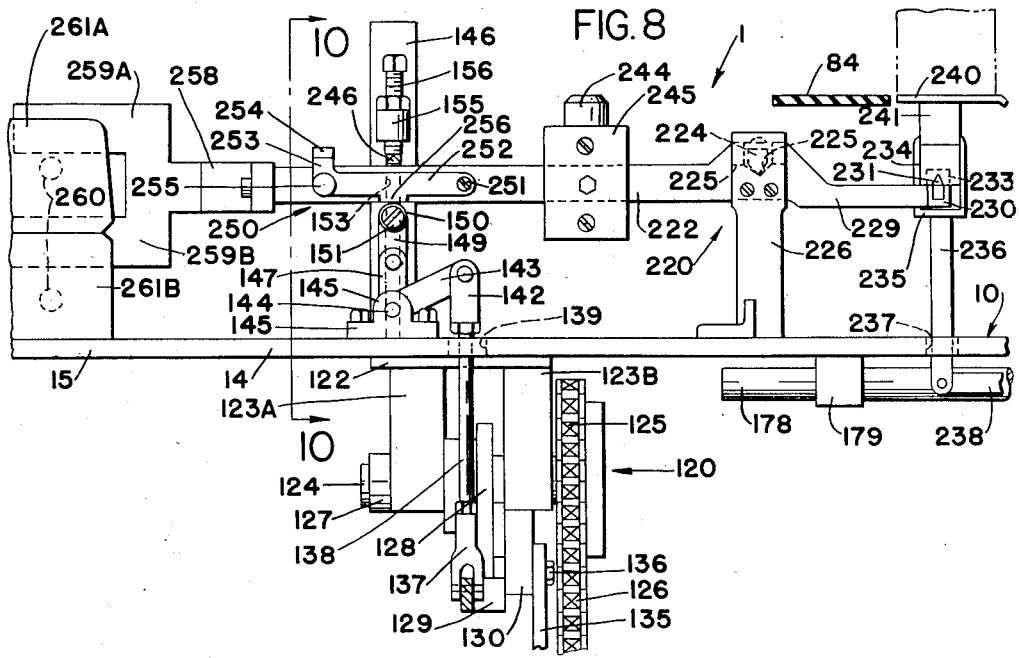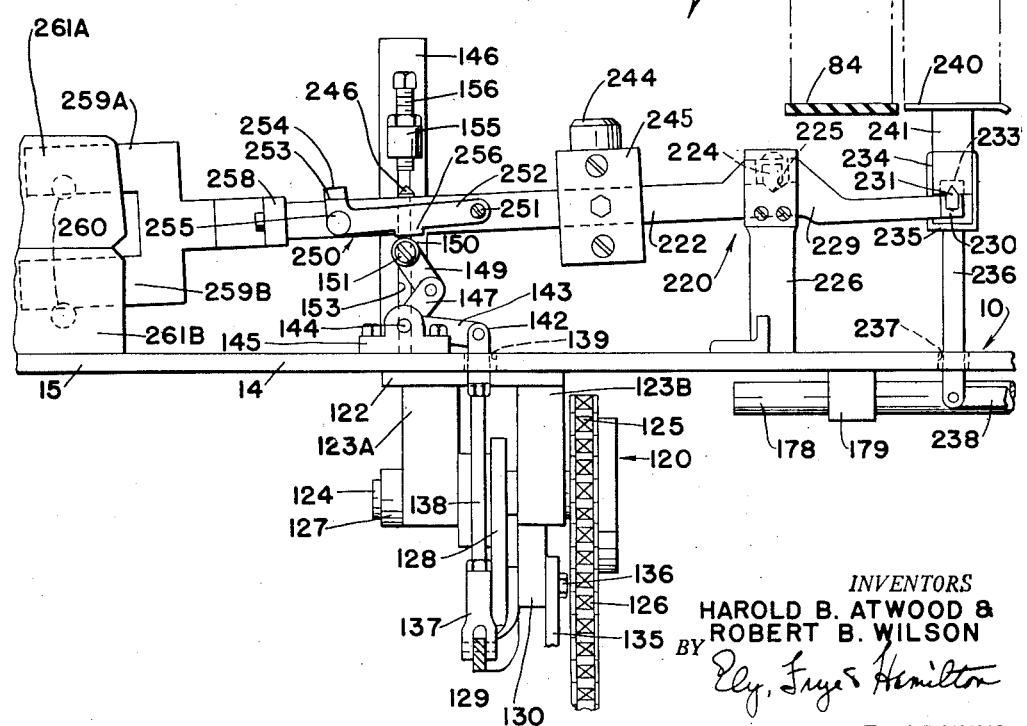

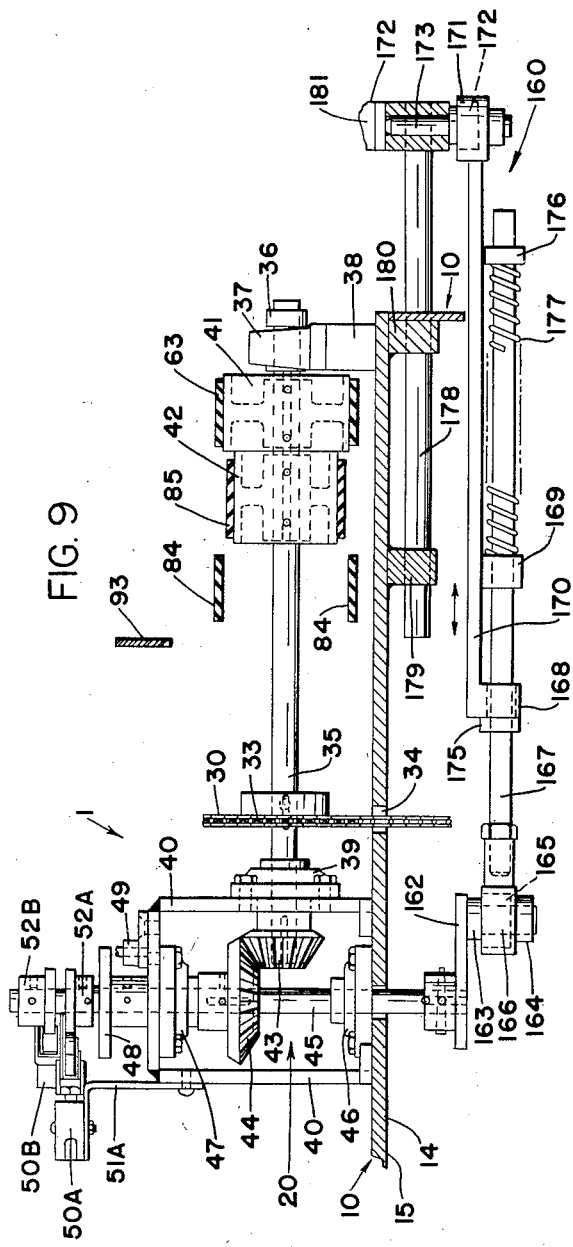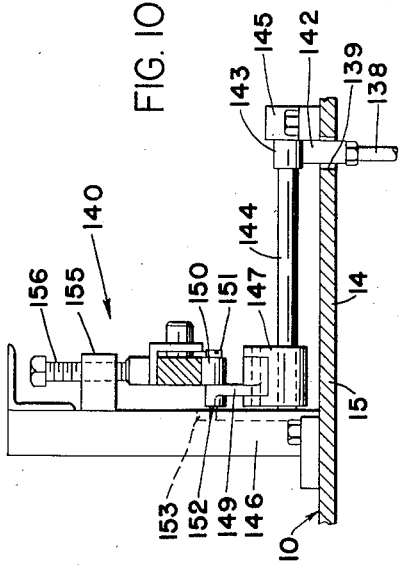

Jan. 7, 1958    H. B. ATWOOD ET AL    2,818,888
METHOD AND APPARATUS FOR CONTINUOUSLY DETECTING
AND CORRECTING LIGHTWEIGHT PACKAGES
Filed April 27, 1955    10 Sheets-Sheet 8
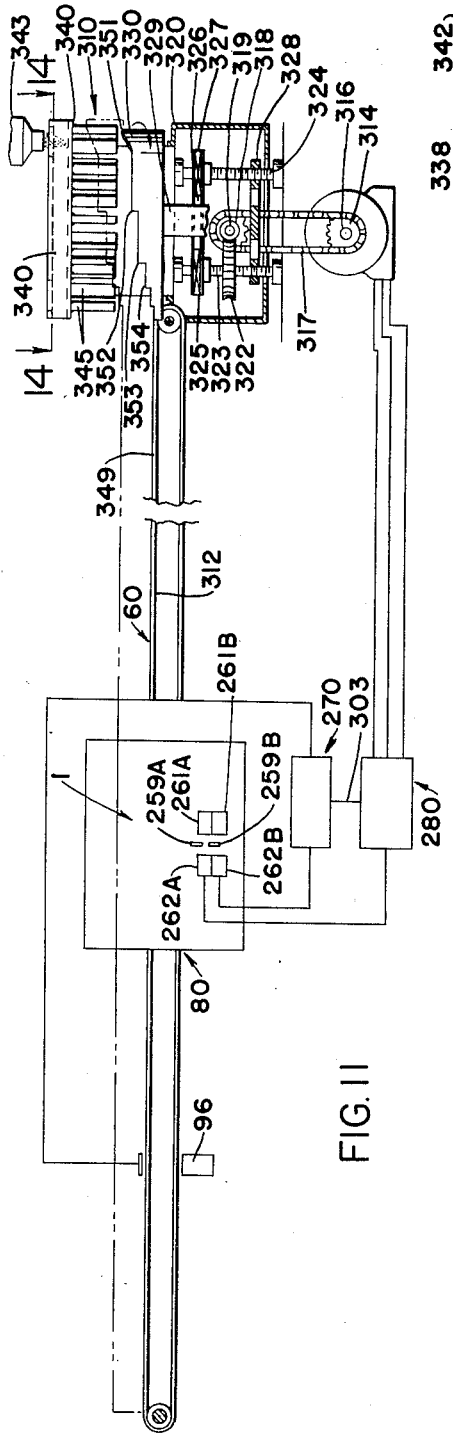
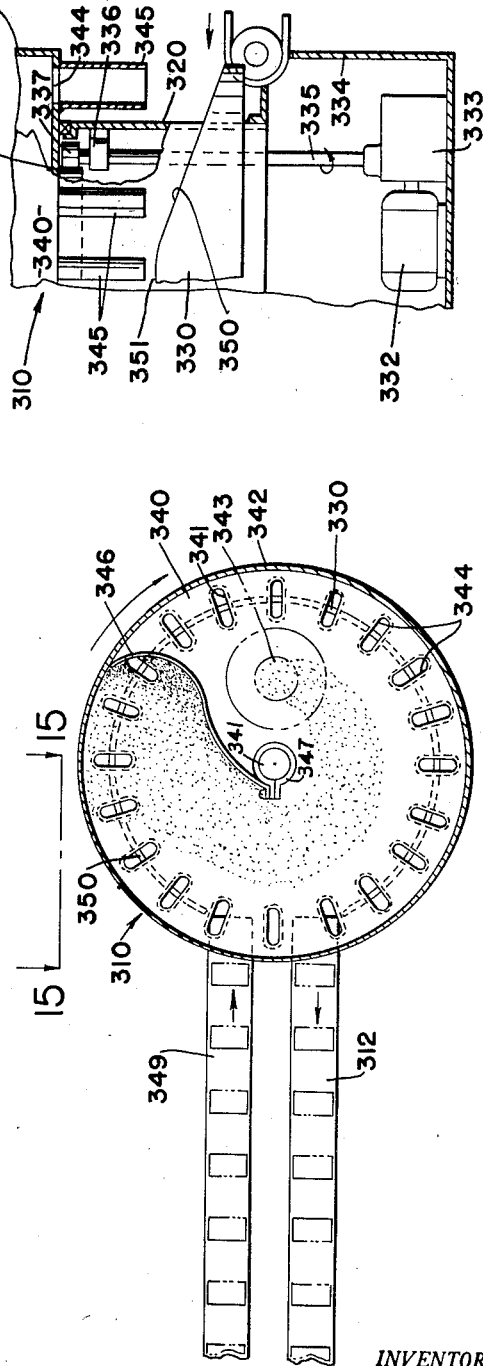
INVENTORS
HAROLD B. ATWOOD &
ROBERT B. WILSON
BY
ATTORNEYS

INVENTORS
HAROLD B. ATWOOD &
ROBERT B. WILSON
BY

ATTORNEYS

United States Patent Office 2,818,888
Patented Jan. 7, 1958

2,818,888

METHOD AND APPARATUS FOR CONTINUOUSLY DETECTING AND CORRECTING LIGHTWEIGHT PACKAGES

Harold B. Atwood and Robert B. Wilson, Sherman, Tex., assignors to The Quaker Oats Company, Chicago, Ill., a corporation of New Jersey Application April 27, 1955, Serial No. 504,184

40 Claims. (Cl. 141—1)

The present invention relates to the volumetric packaging of dry fluent materials. More particularly, the invention relates to an apparatus and method providing for the detection of lightweight packages of processed cereal grains and similar materials moving in a packaging line at a high rate of speed. Further, the invention relates to an apparatus and method for correcting any weight deficiency in a succession of packages under a predetermined set of conditions, and for rejecting any packages which deviate by a predetermined percentage from a standard weight.

Satisfactory apparatus has been developed for the rapid filling of packages or containers with dry fluent materials. However, variation in the density per unit volume of the material being packaged has necessitated the providing of apparatus, distinct and apart from the filling apparatus, for detecting and correcting weight deficiencies in the filled packages. It is well known in the art that the principal limitation as to the speed at which a packaging "line" may be operated is imposed not by the volumetric filler, but by the weighing apparatus following the filler. Prior to our invention, the most satisfactory apparatus, of which we are aware, for weighing each individual package in a succession of filled packages could operate only at a rate approximating 30 packages per minute. On the other hand, the widely known and used "Ferguson" volumetric type filler can fill packages at a rate well in excess of 100 packages per minute.

One type of conventional apparatus for weighing each individual filled package comprises the combination of a scale beam counterweighted to a given weight standard and a light source photoelectric cell combination which senses relative movement of the beam as caused by weight variation in the packages. A signal from the photoelectric cell is transmitted electrically to the filler so as to vary the feed rate. Many attempts have been made to reduce the time required to weigh an individual package but heretofore the best results obtainable, as far as we are aware, have been in the neighborhood of 30 packages per minute or one package every 2 seconds. In the practice of our invention, it is possible to weigh each individual package in less than one second, with a weighing rate of 80 to 100 packages per minute being easily attained.

Therefore, it is an object of the present invention to provide an improved apparatus and method for weighing individual packages at a rate substantially in excess of the weighing rate of conventional scale beam weighing apparatus.

Further, it is an object of the invention to provide an improved apparatus and method for the detection of lightweight packages of processed cereal grains and the like at a high rate of speed.

Another object is to provide an improved apparatus and method for correcting any weight deficiency in a succession of a predetermined number of packages of dry granular materials, and for rejecting any packages which deviate by a predetermined percentage from a standard weight.

Another object is to provide a novel scale beam construction which will permit the rapid detection of weight deficiencies in individual packages of dry granular materials such as processed cereal grains.

Another object is to provide an improved apparatus operated by the lightweight detecting mechanism to control the adjustment of a volumetric filler operating ahead of the weighing apparatus in a packaging "line."

These and other objects are accomplished by the parts, constructions and combinations comprising the present invention. In the drawings and specification, the best known form of the invention is shown and described by way of example, but it will be understood that modifications and changes may be made within the scope of the invention without departing from the spirit thereof, the invention being measured by the appended claims and not by the details of the specification.

Figure 5:
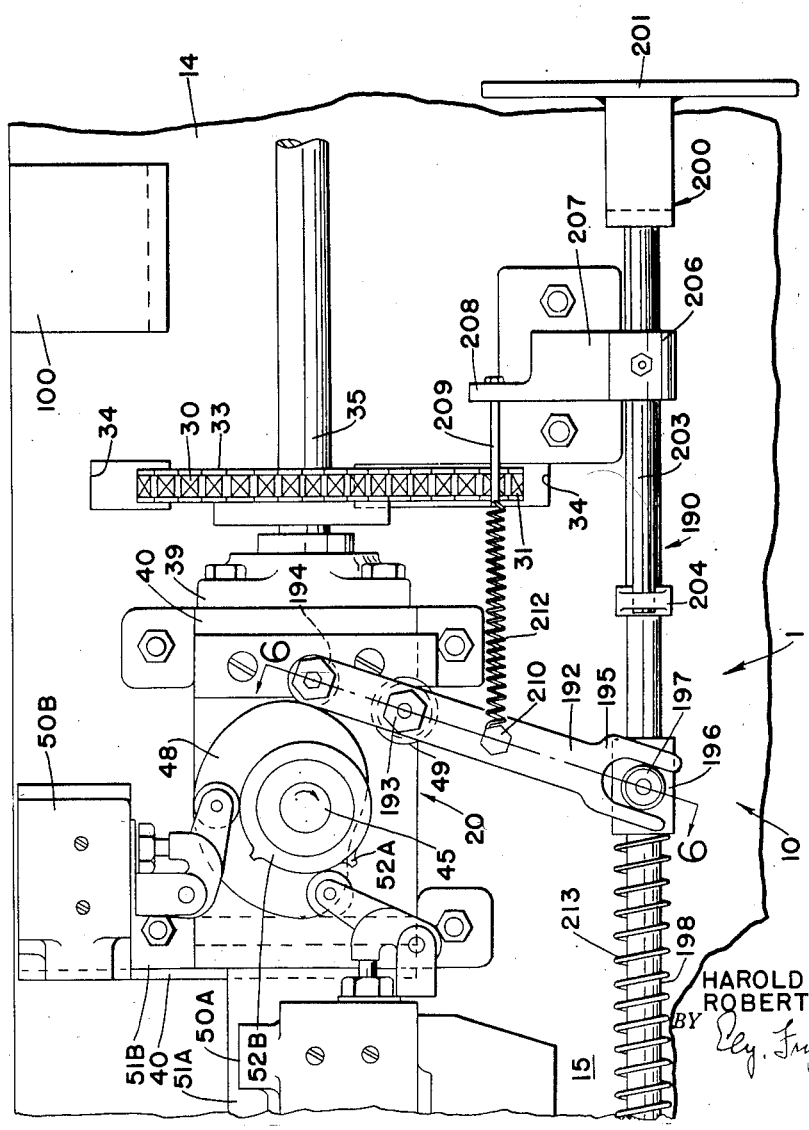
Figure 12:
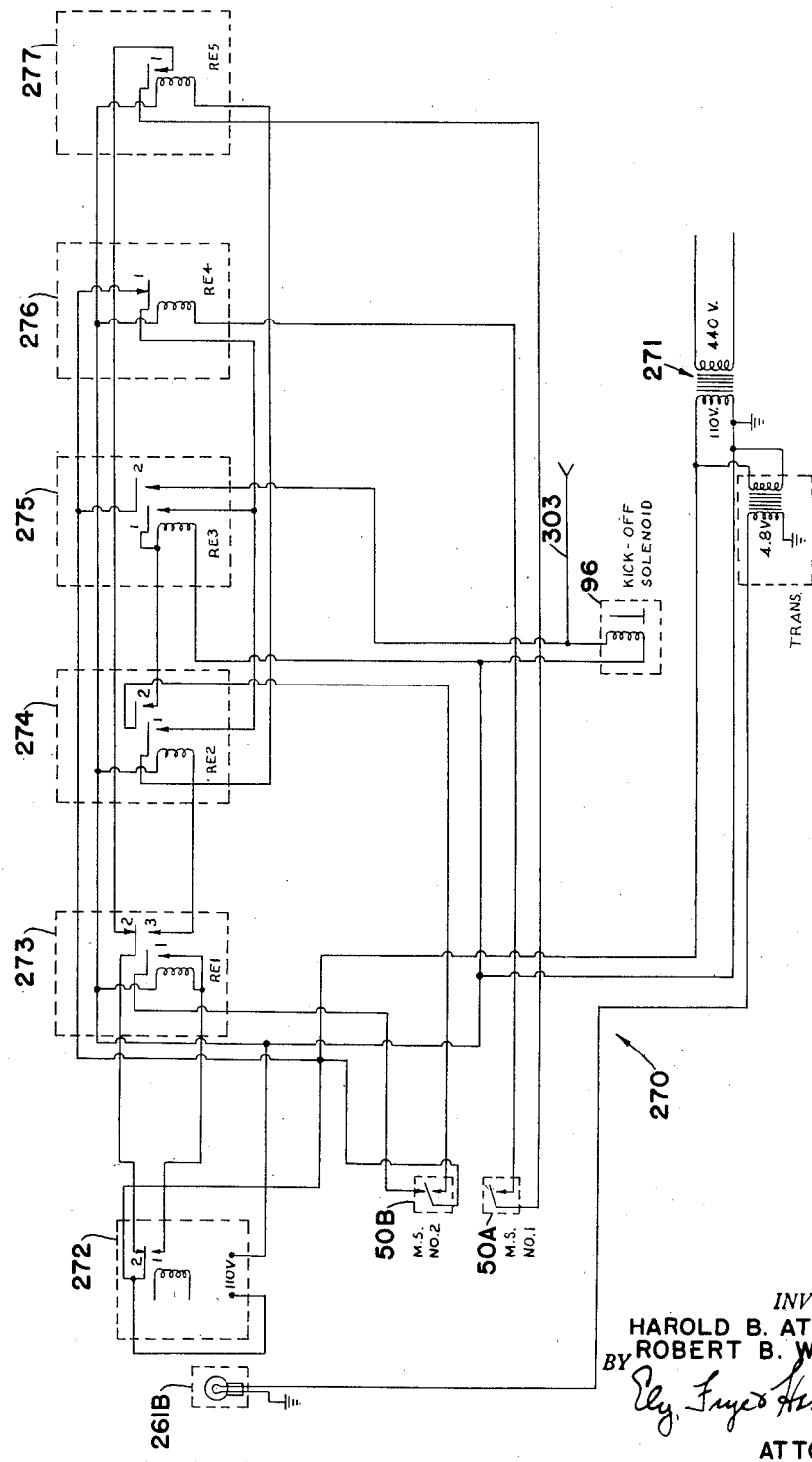
Figure 13:
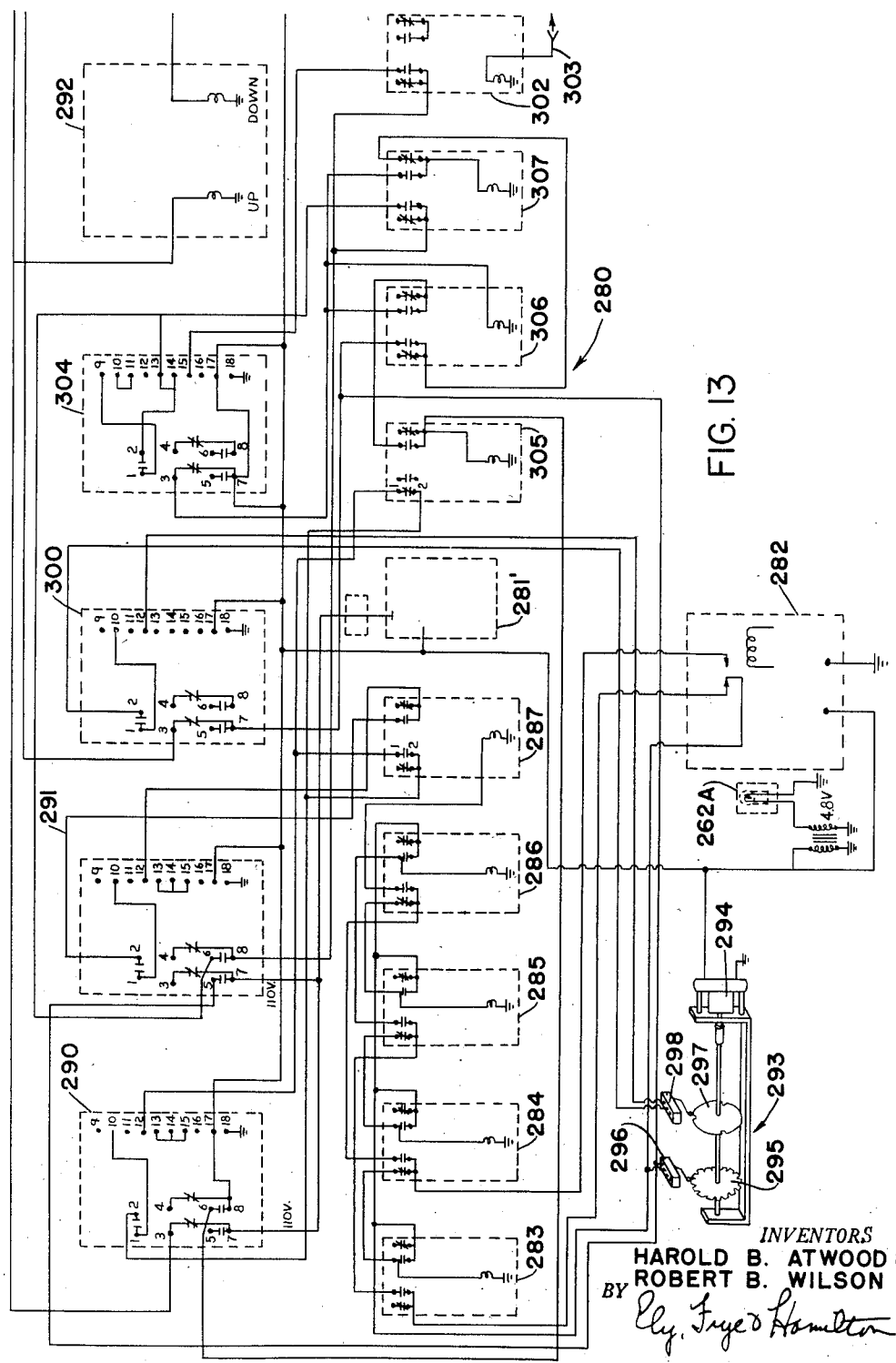

In the drawings:

Fig. 1 is a side elevation, partly cut away, showing the weighing and detecting apparatus, Fig. 2 is an end elevation, partly cut away, at the feeding end of the apparatus, taken at the right side of Fig. 1, Fig. 3 is a top plan view, partly broken away, of the weighing and detecting apparatus, Fig. 4 is a plan view in section, taken substantially on line 4—4 of Fig. 2, Fig. 5 is an enlarged fragmentary plan view, taken substantially on line 5—5 of Fig. 1, showing the package aligner means, Fig. 6 is a sectional view, taken substantially on line 6—6 of Fig. 5, showing the package aligner actuating fork, Fig. 7 is an elevation, taken substantially on line 7—7 of Fig. 4, showing the scale beam as unlocked during actual weighing, Fig. 8 is a view, similar to Fig. 7, showing the scale beam as locked during transfer of the package onto and off the scale platform, Fig. 9 is a view similar to Fig. 2 with parts removed and broken away to show the drive means and package pusher actuating means, Fig. 10 is a view, taken substantially on line 10—10 of Fig. 8, showing the scale beam locking and unlocking means, Fig. 11 is a view, partially schematic, showing the apparatus, including the electrical reject and correction control means, in relation to a "Ferguson" type filler, Fig. 12 is a schematic view of the electrical circuit for rejecting packages deficient in weight below a predetermined minimum, Fig. 13 is a schematic view of the electrical circuit for correcting weight deficiencies in filled packages by adjusting the filling means, Fig. 14 is an enlarged view in section of the "Ferguson" type filler, taken substantially on line 14—14 of Fig. 11, and Fig. 15 is an elevation, partly in section, on line 15—15 of Fig. 14.

In actual operation, the weighing and detecting apparatus is located in the "line" behind a conventional volumetric filler preferably of the "Ferguson" type. Suitable conveyors are provided to convey the filled packages from the filler to the weighing apparatus. The detecting means, which preferably includes light-source-sensing cell combinations, is electrically connected in circuit with suitable feed adjusting means in the volumetric filler, and is also electrically connected to mechanism for mechanically rejecting packages deficient in weight below a predetermined minimum. Accordingly, certain electrical elements may be remotely located as desired.

The apparatus of the invention is constructed so as to permit the rapid weighing of packages in a novel and highly efficient manner. Heretofore, conventional scale beam weighing apparatuses attempting to weigh both light and heavy packages, have inevitably resulted in reducing the weighing rate per unit time. The present invention solves this problem by a combination of several novel features. First of all, the apparatus as a whole detects only lightweight packages and transmits an electric signal only if the package being weighed is deficient or light in weight. Thus any movement of the scale beam caused by an overweight package is disregarded and in fact, mechanically dampened.

Another feature which facilitates the rapid weighing of individual packages is the provision of a gravity actuated hammer, pivotally affixed to the scale beam so that in the event of a lightweight package, especially one only slightly deficient, the movement of the scale beam in response to the lightweight will be greatly accelerated. It is well known that a scale beam nearly in balance begins deflection at a slow rate. Accordingly, the provision of the novel beam hammer, while not affecting the sensitivity of the scale, greatly increases the rate of deflection toward the equilibrium position in the unbalanced condition.

A further feature of the invention involves the correction of any weight deficiency in the filled packages. The movement of the scale beam in response to a lightweight package can intercept the beam of one or both of two light source sensing cell combinations, preferably located one above the other. If the package being weighed is only slightly deficient in weight, that is not below a predetermined minimum, the scale beam will deflect only slightly before the equilibrium position is attained. In this event, only the light beam of the upper photoelectric sensing cell is cut so as to transmit a signal to the electronic elements of the apparatus. Following weighing, the slightly weight deficient package is conveyed away by the same route as are correct weight packages which have not substantially deflected the scale beam.

The presence of a slightly weight deficient package is electrically transmitted from the upper sensing cell to a series of stepping relays which receive the signal caused by the passage through the apparatus of a light weight package. A timer in the holding circuit for the relays is rotated at a speed in correspondence with the rate at which packages are being passed over the scale beam. If within a unit of time, for example, 3¾ seconds at the weighing rate of 80 packages per minute, a total of three signals indicating light weight packages are received by the stepping relays for every five packages weighed then the relays actuate the motor varying the amount of material fed by the "Ferguson" or other suitable filler into the packages. Should only one or two signals be received by the relays indicating that only one or two light weight packages had passed through the apparatus during the period when five packages were weighed, the timer will then clear the stepping relay circuit.

Inasmuch as the detecting apparatus is detecting and signalling the presence of lightweight packages only, the electric feed control elements are so constructed and arranged as to decrease, or periodically vary downward, the amount of material fed by the filler into the packages. Without this lowering or "lower" circuit, the packages at the filler would eventually be filled overweight. At a weighing rate of 80 packages per minute, a .1 ounce change downward every 20 seconds has proven satisfactory. As a result of this "lower" circuit, the detecting mechanism eventually will react to a lightweight package and the corrective or "raise" circuit described above will send an appropriate signal to the motor actuating the filler, thus overriding the "lower" signal. To minimize hunting of the adjusting motor, an adjustment of electronic elements in the circuit is provided so that if the lightened packages have not yet reached the weighing apparatus, a second cyclic "lower" signal will not be transmitted.

If a package deficient in weight below a predetermined minimum precluding commercial distribution is weighed on the scale beam, a deflection will occur which is sufficient to transmit a signal through both photoelectric sensing cells. This causes a signal to a solenoid which actuates a reject gate following the scale so that the rejected package is shunted off the prime conveyor onto a reject conveyor.

The apparatus 1 is primarily designed to handle rectangular packages of processed cereals or grain. These packages may range from 1⁷⁄₁₆ to 2³⁄₁₆ inches wide, 3⅝ to 4⅝ inches long and 6 to 7½ inches high, though packages of other shapes and sizes could be handled thereon if desired.

The mechanical elements of the weighing and lightweight detecting apparatus, indicated generally at 1, include a frame, intake and discharge conveyors supported on the frame, drive means on the frame driving the conveyors, a scale beam mounted on the frame between the intake and discharge conveyors, scale beam locking means operatively connected to said drive means for controlling operation of the scale beam, package pusher means on the frame for positioning successive packages on said scale beam, means for aligning said packages on said scale beam, and means for sensing deflection of the scale beam.

The main frame assembly, indicated generally by the numeral 10, is a rectangular, box-like structure preferably of welded steel construction. Referring to Figs. 1 and 2, the frame assembly 10 includes a lower plate 12 which may be mounted on legs or a suitable foundation as desired. At each corner of the rectangular plate 12 are angle or channel members 13 which support a rectangular upper shelf plate 14. The upper shelf plate 14 has an overhang 15 for a purpose hereafter described, and is provided with various bolt holes, mounting studs and openings, also hereafter described in detail.

*Drive assembly*

Referring to Figs. 1 and 2, the drive assembly, indicated generally by the numeral 20, includes a conventional A. C. 1725 R. P. M. motor 22 bolted to the lower shelf plate 12. The motor drives a gear reducing unit 23 by means of a variable speed motor shaft sprocket 24, a V belt 25 and a reducer input sprocket 26. The gear reducer 23 is also bolted to the lower shelf plate 12. In the preferred embodiment of the invention described herein, the drive shaft 27 of the reducer 23 has fastened and keyed thereto a main drive sprocket 28 and a beam locking drive sprocket 29. The sprocket 28 is connected by a chain belt 30, which passes around a chain adjusting idler sprocket 31, affixed by a bracket 32 to the underside of the shelf plate 14, to a sprocket 33 of the same size as sprocket 28. The sprocket 29 is connected as described elsewhere in detail.

Referring to Figs. 4 and 9, the chain belt 30 passes upward through a pair of rectangular slots 34 in the shelf plate 14. The sprocket 33 is keyed to a horizontal gear sprocket and pulley shaft 35, one end of which is axially positioned by a set screw collar 36 and journaled in a pillow block 37, mounted on bracket 38. The other end of the shaft 35 is supported in a flanged bearing 39 bolted to one side of a cam shaft bearing bracket 40, affixed to and extending upwardly from the shelf plate 14.

Fixed on the shaft 35, adjacent to the pillow block 37, is an intake conveyor drive pulley 41. Adjacent the pulley 41, a discharge conveyor drive pulley 42 is keyed to the shaft 35. The other end of the shaft 35 has keyed thereto a bevel pinion 43. The pinion 43 meshes with a bevel gear 44, keyed to a vertical cam shaft 45 which rotates in a lower flanged bearing 46 bolted to the upper shelf plate 14 and an upper flanged bearing 47 bolted to the cam shaft bearing bracket 40.

Referring to Figs. 5 and 9, above the flanged bearing 47, a balancer fork operating cam 48 is fastened to the shaft 45. The cam 48 actuates a package aligner or balancer fork (see Figs. 5 and 6) which is rotatably mounted in a bracket arm 49 atop the cam shaft bearing bracket 40.

As described elsewhere herein, the electrical elements of the invention respond differently to two types of lightweight packages; those only slightly deficient in weight and those deficient in weight below a predetermined minimum. For the latter packages, a reject gate solenoid is actuated so that the rejected package is shunted off the prime conveyor onto a reject conveyor. As a part of this electrical control, a normally open micro-switch 50A and a normally closed micro-switch 50B are mounted on brackets 51A and 51B affixed to the cam shaft bearing bracket 40. The micro-switches are actuated, in succession, by similar micro-switch cams 52A and 52B mounted one above the other on the shaft 45.

*Intake and discharge conveyor assemblies*

Referring to Figs. 1 and 3, the intake conveyor assembly, indicated generally by the numeral 60, includes a conveyor frame 62 which is bolted to the upper shelf plate 14 of the frame assembly, and an endless conveyor belt 63. Referring to Figs. 4 or 9, the conveyor belt 63 is driven from the drive pulley 41 on the shaft 35 of the drive assembly 20. The tail pulley of the intake conveyor is not shown, the position thereof being determined by the length of the conveyor belt.

Referring again to Figs. 1 and 3, additional lengths of conveyor frame 64 may be added as required to lengthen the intake conveyor. Affixed to the outside of the conveyor frame 62 by a bolt 65A is a resilient guard rail 65, having a package stop finger 65' extending inwardly above the belt 63. Beyond the guard rail 65 is a package stop plate 66 positioned crosswise above the conveyor belt. Affixed to the inside of the conveyor frame is a detour gate 68 which may be swung open laterally when desired by rotation of a vertical detour gate shaft 69 having an arm 70 secured to its lower end. The detour gate is opened when it is desired to shunt packages directly to the discharge conveyor, without passing them over the scale beam, and is maintained in its normally closed position by a coiled tension spring 71 connected between a suitable point on the conveyor frame and the detour gate arm 70. Following the detour gate, a guide plate 75 is affixed to the intake conveyor frame and to the frame of the discharge conveyor. The guide plate has one surface 75A paralleling the conveyor belt 63, and an angular surface 75B intersecting surface 75A to guide detoured packages from the detour gate 68, over a horizontal transfer plate 76 onto the discharge conveyor.

As explained hereinafter, packages which have come into contact with the stop plate 66 are transferred off the conveyor belt 63, at right angles to the movement thereof, onto a scale platform by the movement of a package pusher assembly. To facilitate this transfer a bridge plate 77 extends horizontally from the conveyor frame to a point adjacent to the scale platform. To compensate for any sag in the conveyor belt 63 and so as to facilitate transfer of a package across the plate 77 and onto the scale platform, a plate 78 (shown in dotted lines in Fig. 3) may be fastened to the conveyor frame 62 beneath the conveyor belt, for raising the bottom of each package a slight distance above the bridge plate.

As set forth above, the apparatus is intended to weigh cereal packages of varying shapes and size. Accordingly, if desired, a deflector block 79 (see Fig. 3) may be affixed to the surface of an inside guide rail 75A so as to accurately position a package against the end stop 66.

The discharge conveyor assembly, indicated generally by the numeral 80, includes a prime and a reject conveyor. The prime conveyor frame 82 and reject conveyor frame 83 are each bolted to the upper shelf plate 14 of the frame assembly. The prime conveyor belt is indicated by the numeral 84 and the reject conveyor belt by the numeral 85.

Referring to Figs. 4 or 9, both the prime and reject conveyor belts are driven from the drive pulley 42 on the shaft 35 of the drive assembly 20. Referring to Figs. 1 and 3, the pulley 42 drives the reject conveyor belt 85 which in turn drives a head pulley 86 fastened and keyed to a shaft 87 journaled at its ends in a pair of flange bearings 88. The prime conveyor belt is driven from a pulley 89 fastened to the shaft 87. The other end of prime conveyor belt rotates around a tail pulley 90, which rotates on a shaft 91 horizontally adjustable in the frame 82 by a pair of take-up screws connected to adjusting bar 92.

An inclined guide rail 93 parallel to surface 75B connects the inner side of the intake conveyor frame 62 to the opposite side of conveyor frame 82. The guide rail 93 and the guide surface 75B control the transfer of packages from the intake conveyor belt 63 to the prime conveyor belt, across the transfer plate 76, when the detour gate 68 is opened as described above. The guide rail 93 has a portion 93' extending along the inner side of conveyor 84. At a point 94 intermediate its ends the guide rail 93', (see Fig. 3) is bent outwardly to form a pocket to receive the end of the reject arm 95.

As described elsewhere herein, when a predetermined variation in the weight of a package occurs, a reject gate solenoid 96 is energized so as to actuate a linkage which rotates the reject arm 95 to an inclined position across the surface of the prime conveyor belt so as to shunt the underweight packages onto the reject conveyor belt 85.

Affixed to the outside of the reject conveyor frame 83 is a shorter guide rail 98 which has a pocket 99 therein so as gradually to turn and guide a package which has been shunted on to the reject conveyor belt by the "opening" of the reject arm 95.

Referring to Figs. 1 and 4, the reject arm operating solenoid 96 is affixed to a solenoid mounting bracket 100 extending upwardly from the upper shelf plate 14. The solenoid has a rod 101 extending therefrom which has attached thereto a clevis 102. The clevis is pivoted to one end of a rocking right angled reject gate operating lever arm 104. The lever arm is pivoted at its center hub 105 by a shoulder bolt 106 to an operating lever bracket 107 bolted to the upper shelf plate 14. The other end of the right angled operating lever 104 is connected by a link arm 108 to a reject gate lever arm 109 rigidly affixed to the vertical shaft 110 of the reject gate 95. To maintain the reject gate in a normally closed position, a coiled tension spring 112 is connected between the hub 105 and the lever arm 109. The vertical shaft 110 is rotatably supported in a guide sleeve 114 affixed to a mounting bracket 115 bolted to the underside of the upper shelf plate 14.

The linkage from the vertically movable rod 101 of the solenoid, through the clevis 102, the operating lever 104, the link arm 108 and the lever arm 109 affixed to the shaft 110 is such that a signal energizing the solenoid will actuate the reject gate 95 so that the reject package is shunted off the prime conveyor onto the reject conveyor. When the solenoid is deenergized, the linkage, urged by the coiled spring 112 will cause the reject gate to rapidly return to the normally open position of Fig. 3.

*Beam locking drive assembly*

Referring to Figs. 1, 7 and 8, the scale beam locking drive assembly, indicated generally by the numeral 120, is affixed to the under side of the upper shelf plate 14, by a drive shaft bearing structure 122. The bearing structure has a pair of hangers 123A and 123B which are fitted with suitable bushings (not shown) journaling the short horizontal drive shaft 124 therein. The end of the drive shaft adjacent hanger 123B has fastened thereto an input sprocket 125. This sprocket is connected by a chain belt 126 to the smaller output sprocket 29 on the gear reducer 23. The end of the drive shaft adjacent hanger 123A has fastened thereto a collar 127.

Between the hanger studs of the bearing structure 122, a beam locking cam 128 is keyed to the drive shaft. The cam 128 actuates a cam follower arm 129 which is pivotally supported at one end by a hanger bracket 130 extending outwardly from the hanger stud 123B. For satisfactory actuation by the cam 128, the follower arm 129 is not directly beneath the cam but rather is curved or offset slightly and carries a freely rotating roller 132 (see Fig. 1) making the contact with the cam. The free end of the follower arm 129 is yieldingly supported by a coiled tension spring 133 which is connected between the follower arm and the upper shelf plate 14. To permit adjustment and tightening of the chain belt 126, an idler sprocket 134 is rotatably fastened to a bracket arm 135 which is secured to the hanger bracket 130 by the bolt 136 which also pivotally fastens the follower arm to the hanger bracket. Extending upwardly from the follower arm 129 adjacent to spring 133, and pivoted thereto by a clevis 137, is an adjustable rod 138 which actuates the scale beam locking assembly.

*Beam locking assembly*

Referring to Figs. 1, 7, 8 and 10, the scale beam locking assembly, indicated generally by the numeral 140, is supported on the top of the upper shelf plate 14. The locking assembly is actuated by the rod 138, extending upwardly through a hole 139 in the upper shelf plate 14. A clevis 142 is adjustably threaded onto the upper end of the rod 138 and is pivotally fastened to an operating arm 143 which is pinned to a shaft 144. The outboard end of the shaft 144 is journaled in a shaft bracket 145 bolted to the upper shelf plate. The inboard end of the shaft 144 is supported by a bearing bracket 146, also bolted to the upper shelf plate. A clevis 147 is pinned to the shaft 144 at a point adjacent to the inside vertical surface of the bearing bracket 146.

When the rod 138 is actuated by the locking drive assembly 120, the force is transmitted through the operating arm 143 to the shaft 144, and then through the clevis 147 to a locking arm 149 pivoted to the locking clevis. The upper portion of the locking arm 149 is fitted with a freely rotating locking roller 150 for making contact with the under side of the scale beam so as to lock or unlock the beam. The roller is fastened to the locking arm 149 by a shoulder bolt 151 which has an extended end 152 which projects into a vertical guide slot 153 in the inner face of the bearing bracket 146 (see Fig. 10). The guide slot 153 and bolt end 152 enable the locking arm to move up and down beneath the scale beam to lock or unlock the beam.

The upper portion of the bearing bracket 146 is provided with a horizontally extending centering pin bracket arm 155 which supports an adjustable centering pin 156 above the locking roller 150 and its point of contact with the scale beam. As shown in Fig. 8, when the scale beam is locked, the roller 150 is in contact with the underside of the scale beam and the centering pin 156 is in contact with the upper side of the scale beam. As shown in Fig. 7, to unlock the scale beam, the rod 138 is actuated by the beam locking drive assembly 120 which moves the operating arm 143 downward. The linkage from the operating arm, through the shaft 144, the clevis 142 and the locking arm 149 is such that a force transmitted by the rod will instantly result in the locking roller dropping away so as to unlock the scale beam so that rapid weighing may take place.

*Package pusher assembly*

The package pusher assembly, indicated generally by the numeral 160, transfers a package from the intake conveyor belt 63, over the bridge plate 77 and onto the scale platform. Referring to Figs. 2 and 9, the pusher assembly is driven by an eccentric 162 pinned to the lower end of the vertical cam shaft 45 which can be rotated at speeds in excess of 100 R. P. M., as may be desired. A pivot pin 163 on the eccentric extends vertically downward through the bore of a bearing means 165 fitted into one end of a connector member 166, and member 166 is supported on pin 163 by a collar 164. Into the other end of the connector member is adjustably threaded a connecting rod 167 which is slidably supported by bearing brackets 168 and 169 on an offset connector 170.

The portion of the offset connector which extends outwardly of the main frame assembly 10 terminates in a horizontal collar 171 journaling a stud pin 173 fitted into the underside of a pusher support and bracket 174. Between the connector 166 and bearing bracket 168, and adjacent to the latter, a collar 175 is fastened to the connecting rod 167. A second collar 176 is fastened to the other end of the connecting rod in such a manner as to compress a coiled spring 177 against bearing bracket 169.

When the eccentric 162 is in the position shown in Fig. 9, the pusher assembly 160 is cleared to its furtherst away position with respect to the intake conveyor belt 63. Rotating the eccentric 162 transfers linear movement through the connector 166, the connecting rod 167, the collar 175, the offset connector 170 and the horizontal collar 171 to the stud pin 173.

To actuate the pusher assembly so as to transfer a package from the intake conveyor belt 63 onto the scale platform, the eccentric is rotated 180° from the position shown in Fig. 9, causing the spring 177 to become compressed against bearing bracket 169. When the rotation of the eccentric starts to return it to the position of Fig. 9, the compression energy of the spring 177 will assist in the clearing and return of the pusher assembly from above the intake conveyor belt. Thus the transfer motion is dampened by the compression of the spring, while the return or clearing motion is accelerated by the decompression of the spring.

The pusher bracket 174, which extends vertically upward to a position above the intake conveyor belt, is supported and guided in its horizontal transfer and return reciprocation by a pair of slide rods 178, fastened by bearing brackets 179 and 180 to the underside of the upper shelf plate 14 and extending outwardly of the frame assembly.

Referring to Figs. 2 and 3, the pusher bracket 174 has a bar 181 extending upwardly therefrom to the upper end of which a flange 182 of the rectangular box-shaped package pusher 185 is bolted. Preferably, a brace member 181' connects the upper end of bar 181 to the opposite side of bracket 174. When actuated to transfer packages as described above, the pusher 185 passes between the end stop 66 and guard rail 65, across the intake conveyor belt 63, to a point above the scale platform, thereby moving a package from against the end stop and across the bridge plate 77 and onto the scale platform, and at the same time the said package pushes a previously weighed package off the scale platform onto the prime conveyor belt 84. To prevent succeeding packages on the intake conveyor 60, from interfering with the operation of the pusher 185, a flange 186 on the side of the pusher makes contact with the front end of guard rail 65, thereby moving the finger 65' in front of the next succeeding package for a time sufficient to allow the pusher to retract to its original position.

*Package aligning assembly*

The package aligning assembly, indicated generally by the numeral 190, operates subsequent to the pushing operation of the pusher assembly 160, and after a previously weighed package has been transferred off the scale platform onto the prime conveyor belt 84, to accurately position a package being weighed on the scale platform.

Without the aligning assembly 190, a package transferred from the intake conveyor belt 63, across the bridge plate 77 and onto the scale platform would be unsteady and tend to "rock," or be "off-center," on the scale platform so as to render an inexact weight or materially effect the rate at which the scale could weigh each package.

Referring to Figs. 3, 5 and 6, the aligning assembly 190 includes a package aligning fork 192, rotatably mounted by a shoulder bolt 193 in the bracket 49 on the cam shaft bearing bracket 40. At one end, the fork has rotatably fastened thereto a follower roller 194 which is contacted by the outer radius of the cam 48 fastened to the shaft 45 of the drive assembly. The other end of the fork 192 has a bifurcated prong 195 which engages with aligned anti-friction bearings 197 journaled on the top and bottom of a bearing block 196, which is fastened to a horizontal package aligning rod 198. The outboard end of the rod 198 is slidably supported in a bushing (not shown) fitted into an outboard bearing bracket 199 bolted to and extending upwardly from overhang 15 of the upper shelf plate (Fig. 2). The inboard end of the rod 198 is affixed to the lower part of a C-shaped member 200 which has welded thereto, top and bottom, a pair of pusher bars 201 which make the actual contact with the package being aligned. A stabilizing rod 203 is spaced above and parallel with the aligning rod 198, and connects rod 198 with C-shaped member 200. The rods 198 and 203 are tied together by a spacer bracket 204, and slidably supported in bushings (not shown), fitted into a vertical extension 206 of an inboard bearing bracket 207 bolted to the upper shelf plate 14.

Laterally opposite the flange 206 on the bearing bracket 207 is a spring mounting flange 208 and spring attaching bolt 209. Attached between the bolt 209 and an attaching bolt 210 on the aligning fork 192, is a helical tension spring 212. Around the aligning rod 198, between the outboard surface of the bearing block 196 and the inboard surface of the bearing bracket 199, is a helical compression spring 213. The springs 212 and 213 are always tending to "extend" or move the aligning assembly 190 across the prime conveyor belt 84 and over the scale platform.

As shown in Fig. 5, the package aligning assembly 190 is fully retracted by the contact of the outer radius of the cam 48 with the roller 194 during rotation of the shaft 45. As the cam 48 continues to rotate from the position shown in Fig. 5, the fork 192 is free to rotate counterclockwise on pivot bolt 193 under the force of the springs 212 and 213. Thus, the extending or balancing motion of the assembly 190 is produced by the springs, while the retracting motion, during which a weighed package is transferred from the scale platform to the prime conveyor belt 84, is brought about by the action of the cam 48, against the force of the springs 212 and 213.

*Scale beam assembly*

The scale beam assembly, indicated generally by the numeral 220 in Fig. 1, is controlled in its operation by the scale beam locking drive assembly 120 and the scale beam locking assembly 140 in the manner previously described. Referring to Figs. 4, 7 and 8, the scale beam 222 has fastened thereto a transverse bearing bar 224 having a knife edge on its under side. The knife edge is supported in V-grooves in a pair of flanges 225 extending inwardly from either side of a fulcrum base 226 affixed to the upper shelf plate 14, and thus provides the pivot means for the scale beam 222.

The fulcrum end of the scale beam is bifurcated at 228, as shown in Fig. 4, to form fork arms 229. Affixed crosswise of the arms 229 is a scale pivot bearing holder bar 230 which has a pair of knife edged scale pivot bearings 231 on the upper sides of its outer ends. The pivot bearings contact and support a pair of pivot members 233 affixed to a scale platform base member 234. To stabilize the base member on the pivot bearings 231, a bifurcated stabilizing fork 235 straddling the bar 230 is affixed to either side of the base member 234. The fork 235 has a depending leg portion 236 which passes through a rectangular slot 237 in the upper shelf plate 14 and is pivotally fastened to an aligning fork link arm 238, lying beneath the upper shelf plate and extending longitudinally beyond the end of the scale beam. The other end of the link arm 238 is pivoted to the under side of the upper shelf plate 14 at 239 (see Fig. 4). The base member 234 is attached to the lower ends of spacer studs 241 which support a scale platform plate 240.

Referring to Figs. 7 and 8, the presence of a deficient or light in weight package on the scale platform plate 240 will cause the scale beam 222 to deflect counterclockwise around the main pivot bearing 224. A replaceable weight 244 is mounted on an adjustable bracket 245 located on the lever portion of the scale beam 222 so as to permit accurate adjustment of the amount and rate of such deflection.

Outboard of the adjustable bracket 245 is the bearing bracket 146 and centering pin 156. A beam centering pin 246 is affixed to the upper surface of the scale beam 222 so as to engage with the pin 156 when the scale beam is locked (Fig. 8).

To accelerate the deflection of the scale beam 222 in the event of a deficient or light in weight package on the scale platform plate 240, a gravity actuated hammer, indicated generally by the numeral 250, is pivotally affixed by a fastening means 251 to the side of the scale beam 222 away from the bearing bracket 146. The hammer 250 includes a leg portion 252 extending longitudinally of the beam and terminating in a horizontal flange portion 253 extending over the top surface of the scale beam 222. Replaceable weights 254 and 255 are fastened to the horizontal flange 253 and the leg 252 so as to add mass to the hammer 250. At a point on the underside of leg 252, a projection 256 is provided to engage the roller 150 for raising the hammer.

Referring to Fig. 8, when the roller 150 has been actuated by the drive assembly 120 and locking assembly 140 so as to lock the beam 222, the roller will have contacted the surface 256 so as to raise the weighted end of the hammer 250 a relatively slight distance above the top surface of the scale beam. When the beam is unlocked, the hammer 250 will drop faster than the beam and thus will lightly hammer or "tap" it. The tapping, while not affecting the sensitivity of the scale assembly 220, greatly increases the rate of deflection to where the equilibrium position in the unbalanced position is attained.

Affixed to the outer end of the scale beam 222 is a beam flag mounting flange 258, to which is adjustably affixed a beam flag having vertically spaced flag arms 259A and 259B intended to intercept the light beams indicated schematically at 260 from a pair of light source cells 261A and 261B, and photoelectric sensing cells 262A and 262B each mounted one atop the other on the upper shelf plate 14. If the package being weighed is only slightly deficient in weight, then the flag 259A will intercept only a substantial part of the beam 260 between cells 261A and 262A, sending an appropriate signal to the electrical elements of the apparatus, but allowing the package to be conveyed away on the prime conveyor belt 84.

If the package is deficient in weight below a predetermined minimum, the flags 259A and 259B will intercept a substantial part of both the beams 260 between cells 261A and 262A, and 261B and 262B, sending an appropriate signal to the electrical elements of the apparatus which in turn actuates the solenoid 96 and the reject arm 95 to cause the package to be shunted off of the prime conveyor belt 84 onto the reject conveyor belt 85.

The electrical elements of the apparatus 1 include a conventional magnetic starter and push button station for controlling the motor 22; a "reject circuit" for detecting and rejecting packages deficient in weight below a predetermined minimum; and a "correction circuit" for detecting and correcting any weight deficiency in the packages being weighed.

Reject circuit

The "reject circuit," indicated generally in Fig. 12 by the numeral 270, is constantly energized with current of a suitable voltage from a conventional power source connected to the transformer 271. The circuit 270 operates to detect the presence of a package deficient in weight below a predetermined minimum when the scale beam assembly 220 is unlocked by the scale beam locking assembly 140. The circuit is actuated so as to cause rejection of a package deficient in weight below a predetermined minimum when the scale beam flag 259 is deflected sufficiently downward (see Fig. 7) so as to substantially interrupt the beam 260 between the light source cell 261B and the sensing cell 262B.

Referring to Fig. 11, a photo cell relay 272 is operatively connected with the photoelectric sensing cell 262B (not shown). When the beam 260 is substantially interrupted, the normally open contact 1 of the photo cell relay 272 is closed. The photo cell relay 272 is connected as shown to five magnetic relays 273, 274, 275, 276 and 277.

The closing of contact 1 in relay 272 closes contacts 1 and 3 of relay 273. During this period of time, the scale beam assembly 220 will have been locked by the scale beam locking assembly 140. Also, the package pusher assembly 160 will have begun to transfer a package from the intake conveyor belt 63 onto the scale platform 240, at the same time moving the weighed package from the scale platform 240 onto the prime conveyor belt 84. The return of the scale beam 222 to its locked position removes the beam flag 259B from between the cells 261B and 262B, thereby opening contact 1 and closing contact 2 of the photo cell relay 272.

The closing of contact 2 in relay 272, through contact 3 of relay 273, energizes the second and fifth relays, 274 and 277. The relay 273 is held in circuit, after the cycle of energizing and de-energizing the photo cell relay 272, by means of contact 1 of the relay 273 and the normally closed contact of the micro-switch 50B (see Fig. 5).

The rotation of the cams 52A and 52B, on the vertical shaft 45, actuate, in turn, the contacts of the micro-switches 50A and 50B. As the shaft 45 rotates clockwise (as shown in Fig. 5), the closing of micro-switch 50A does not energize any of the five relays, due to contact 2 of relay 273 being open at this time. After micro-switch 50A is cleared by the cam 52A, then the micro-switch 50B is actuated by cam 52B, thereby opening the normally closed contact of the micro-switch and opening the contact 1 of relay 273 which had been held closed in circuit.

The closing of contact 2 in relay 273 energizes the third relay 275 closing contact 1 which is held in circuit by contact 1 of the unenergized fourth relay 276. As the micro-switch 50B is actuated by the cam 52B, contact 2 of the relay 275 closes, energizing the reject gate solenoid 96 and causing the rejected package to be shunted off the prime conveyor onto the reject conveyor.

During this period of time, the package aligning assembly 190 will have been extended over the prime conveyor belt 84 to above the scale platform 240 so as to position a package transferred onto the scale platform by the pusher assembly 140.

The reject gate solenoid remains energized, as do relays 274, 275 and 277, until a correct weight package or a package only slightly weight deficient is weighed on the scale beam assembly. A package of either type will cause no substantial interruption of the light beam 260 between cells 261B and 262B, so that the photo cell relay 272 does not become energized and contact 1 remains open while contact 2 remains closed. After the weighing cycle is completed, as determined by the time required for a 360° rotation of the vertical cam shaft 45, there being no closing of contact 1 in relay 272, micro-switch 50A will be actuated by cam 52A so as to open contact 1 of relay 276, the circuit being completed through contact 2 of the photo cell relay 272, contact 2 of relay 273 and contact 1 of relay 277. However, upon the opening of the contact 1 in relay 276, the holding circuit for relays 274, 275 and 277 is broken and they become de-energized. When relay 275 is de-energized, contact 2 is opened thereby breaking the circuit for the reject gate solenoid 96 which causes rod 101 of the solenoid to retract so that the clevis 102, operating lever 104, link arm 108, lever arm 109 and the shaft 110, assisted by the spring 112 will cause the reject gate to return to the normally closed position.

In the event of a package deficient in weight below a predetermined minimum, following a correct weight package or a package only slightly weight deficient, the reject gate will be opened again, all as described above.

Correction circuit

The "correction" circuit, indicated generally by the numeral 280, is constantly energized with current of a suitable voltage from a conventional power source through thermal time relay 281'. The circuit 280 operates to detect the presence of a package deficient in weight, in any amount, when the scale beam assembly is unlocked by the scale beam locking assembly 140. The circuit is actuated so as to cause the material being fed into packages at a remotely located filling station by a "Ferguson," or other type filler, to be varied in amount when the scale beam flag 259 is deflected sufficiently downward (see Fig. 7) so as to substantially interrupt the beam 260 between the light source cell 261A and the sensing cell 262A, by a certain number of lightweight packages in a predetermined amount of time.

Referring to Fig. 13, a photocell relay 282 is operatively connected with the photoelectric sensing cell 262B (not shown). When the beam 260 is substantially interrupted, the normally open contact of the photocell relay 282 is closed. The photocell relay is connected as shown to five magnetic normally open relays 283, 284, 285, 286 and 287 which function as a "step-type" or "telephone-type" series of relays.

The closing of the contact in relay 282 energizes relay 283 which remains closed through a holding circuit. During this period of time, the scale beam assembly 220 will have been locked by the scale beam locking assembly 140. Also, the package pusher assembly 160 will have begun to transfer a package from the intake conveyor belt 63 onto the scale platform 240, at the same time moving the weighed package from the scale platform 240 onto the prime conveyor belt 84. The return of the scale beam 222 to its locked position removes the beam flag 259 from between the cells 261A and 262A, thereby returning contact of the photocell relay 282 to its normally open position.

The opening of the relay 282 energizes relay 284 through the first relay 283 which has remained closed and in circuit. During this period of time, the weighing cycle has been completed by the extension and withdrawal of the package balancer assembly 190 from over the scale platform 240 and the prime conveyor belt 84. Thus, after one package has been weighed and found to be deficient in weight, relays 283 and 284 are closed and in circuit.

During succeeding weighing cycles, a second lightweight package will close the photocell relay 282 and energize relay 285 through the first relay 283 and the second relay 284 which have remained closed and in circuit. When relay 282 is again opened by the completion of another weighing cycle and locking of the scale beam assembly 240, the opening of the relay 282 energizes relay 286 through the first, and third relays, 283 and 285 which have remained closed and in circuit.

Thus, after the weighing of a second lightweight package, relays 283, 284, 285 and 286 are closed and in circuit.

In the event of weighing a third lightweight package, the closing of relay 282 will energize relay 287 through relays 284 and 286. The closing of relay 287 initiates the correction of the weight deficiency by the energization of the electronic timed delay relays 290 and 291.

When the electronic circuits of relays 290 and 291 (and 300) are "warm," a signal through terminals 2 and 12 will instantly actuate and close one pair of contacts and open another pair of contacts. Referring to relay 290, the contacts 3 and 7 control the passage of current to a magnetic combination reversing starter (shown in chain lines 292) which will cause a reversible motor (not shown) on the package filling apparatus to run in the "raise" direction, that is, to increase the amount of material being filled into each package. The electronic circuit is adjustably set to allow the filler motor to run in the "raise" direction for the desired time (preferably 5 seconds). At the end of the "raise period," contacts 3 and 7 open and contacts 6 and 8 close.

The relay 291 is provided to prevent a second "raise signal" being transmitted to the filler motor before corrected packages reach the scale platform 240. The electronic circuit is adjustably set for a period determined by the rate at which the filler responds to a "raise signal" and the distance of the apparatus 1 from the filler. The signal from relay 287, through terminals 2 and 12 will open contacts 5 and 7 thereby locking out the holding circuit for the relays 283—286 so that a second "raise signal" cannot be transmitted until corrected packages have the opportunity to reach the scale platform. At the end of the "no action" period, contacts 5 and 7 close restoring the holding circuit for the step relays 283—286, and contacts 6 and 8 open. The step relays are then free to initiate a second "raise signal" if lightweight packages are still being weighed.

In order to reduce the possibility of overcorrection by frequent "raise signals," to minimize hunting of the filler motor, and to allow for an occasional lightweight package in an otherwise correct weight series, it is desirable to provide a means for clearing the step relays 283—286 unless a certain number of lightweight packages in a predetermined period of time are signalled by the sensing cells 261A and 262A. This may be done by a timer, indicated generally by the numeral 293, driven by a motor 294.

For example, at the weighing rate of 80 packages per minute, it has been found desirable to receive at least three signals for every five packages weighed before causing the filler motor to "raise." Accordingly, a 16 notch cam 295 is affixed to the shaft of the timer 293 and caused to rotate by the motor 294 at one (1) R. P. M. The rotation at 1 R. P. M. and the 16 notches means that unless three signals are received within 3.75 seconds, micro-switch 296 will have opened the holding circuit of the relays 283, 284, 285 and 286, before the "raise" signal can be transmitted to the filler motor. In any event, the holding circuit for the relays is cleared every 3.75 seconds (or five packages at 80 packages per minute) and the signals must start again for the next series of packages.

A second cam 297, having three notches, is affixed to the shaft of the timer 293 so as to actuate a second micro-switch 298, three times per minute (at a weighing rate of 80 packages per minute).

Inasmuch as the apparatus 1 detects and signals the presence of lightweight packages only, it is desirable to provide a means for periodically decreasing or lowering the amount of material filled into each package. This may be done by a third electronic time delay relay 300 which is energized through terminals 2 and 12 by the actuation of the micro-switch 298.

Energization of the relay 300 will close contacts 3 and 7 and will complete a circuit in series with the holding circuit for the step relays 283—286. If the holding circuit is locked out by opened contacts 5 and 7 on relay 291, indicating a "raise period" in progress, then no signal to the filler motor to "lower" is transmitted.

If the holding circuit for the step relays is not cleared, then the relay 300 will signal the filler motor to "lower" the amount of material filled into each package. The electronic circuit is adjustably set so that the "lower" signal will preferably decrease the material approximately 0.1 ounce per package. The "lower" signal may be repeated at 20 second intervals until such time as the relay 290 transmits a "raise" signal.

The "correction" circuit 280 responds as described above to any weight deficient package whether it be only slightly weight deficient or deficient in weight below a predetermined minimum. Further, in normal operation the relay 291 delays transmission of a second "raise signal" for a predetermined period of time. However, in the event of a series of reject packages it becomes desirable to "by-pass" the relay 291 and initiate a second "raise signal" immediately following a normal "raise signal." This may be done by a means including a magnetic relay 302 connected as at 303 to the reject circuit 270 which remains energized so long as reject packages are weighed.

The closing of relay 302 will energize a fourth electronic time delay relay 304 through terminals 13 and 15. The electronic circuit of relay 304 is adjustably set opposite to those of relays 290, 291 and 300, in that the delay period takes place before closing one pair of contacts and opening another pair of contacts. Thus when a series of rejects are signalled to the delay relay by the closing of relay 302, the delay relay will wait a predetermined period of time (preferably 3–5 seconds) before initiating further action by the opening of contacts 3 and 7 and the closing of contacts 6 and 8, through three magnetic relays 305, 306 and 307.

When the delay relay 290 is not energized, contacts 6 and 8 are closed, energizing and closing relay 305. When the contacts 3 and 7 of the relay 304 are closed, relay 306 is energized and closed which in turn energizes and closes the relay 307. Thus, when no "raise" is being actuated by the relay 290 and there are no reject packages energizing relay 304, through relay 302, relays 305, 306 and 307 are all energized and closed. Further, once energized, relay 305 will remain closed if either the relay 290 remains open, that is, not actuating a "raise" or the relay 304 remains in its normal position. Accordingly, the "normal" operation of the step relays and the relays 290 and 291 does not affect relay 305 and the normal "raise" signal may be transmitted to the filler motor.

When a series of rejects are signalled by relay 302, after the delay period, relay 304 will actuate opening contacts 3 and 7 and opening relays 306 and 307. When this occurs during a normal "raise period," the contacts 6 and 8 of relay 290 will be opened and relay 305 will also be opened. However, contacts 1 and 2 of relay 305 are in parallel with contacts 1 and 2 of relay 287, so that at the end of the normal "raise period," at the instant contacts 6 and 8 of relay 290 close, the relay 305 will close and reactuate the relay 290 causing contacts 3 and 7 to close signalling the filler motor to raise.

The reclosing of relay 305, to reactuate the relay 290, is not possible unless the electronic delay circuit of relay 291 is locked out. When relay 290 was energized, relay 291 was also energized opening contacts 6 and 8 which allows the contacts 3 and 7 of relay 304 to reclose. After opening to drop out relays 306 and 307, the electronic circuit of relay 304 locks out the signal from relay 302 for the predetermined period of time. The closing of contacts 3 and 7 of relay 304 closes relay 306 but relay 307 cannot close because the opening of contacts 5 and 7 on relay 291 locks out the holding circuit for relay 307, as well as for the step relays 283—286. However, relay 307 being open the holding circuit is locked out for relay 305 so that upon the expiration of the normal "raise period," the second "raise" may be signalled. After reactuating the relay 290, relay 306 being closed, relay 305 will remain closed.

In the event of a series of reject packages following a series of correct weight packages, the filler motor will first be actuated by a series of signals through the step relays. However, relay 304 will be energized by relay 302, so that a second consecutive "raise signal" will be initiated without waiting for a second signal through the step relays, in the manner described above.

It will be apparent that various changes and substitutions of electrical components could be made in either the reject circuit 270 or the correction circuit 280 without departing from the principles of operation as described above. For example, the relays 273—277 and 283—287 could have substituted therefor a "telephone" type step relay.

Referring to Fig. 11, in actual operation, the apparatus 1 is located in the "line" behind a filling station at which a conventional volumetric filler indicated generally by the numeral 310, preferably of the "Ferguson" type is located. Suitable conveyors 312 are joined to the intake conveyor frame to convey filled packages to the apparatus 1. The detecting means, including the light source-photoelectric cell combination 261A and 262A, are electrically connected through the correction circuit 280 to the reversible adjusting motor 314 of the filler. The light source-photoelectric cell combination 261B and 262B is electrically connected through the reject circuit 270 to the reject gate solenoid 96.

The adjusting motor 314 has a sprocket 316 on the drive shaft which is connected by a chain belt 317 to an upper sprocket 318 affixed to a horizontal shaft 319 rotatably mounted between opposite walls of the upper frame 320. Affixed to shaft 319 is a worm 321 which engages and drives a worm gear 322 which is fixed on one of two parallel threaded drive shafts 323 and 324 journaled in the frame of the filler. Affixed to shaft 323 is a sprocket 325 which is connected by a chain belt 326 to a corresponding sprocket 327 on shaft 324. Rotation of the gear 322 on shaft 323 will cause shaft 324 to rotate in a like manner so as to move, either upward or downward, a cross bar 328 threaded at each end onto the shafts 324 and 325. Medially affixed to the cross bar 328 are tie plates 329 (only one of which is shown) which extend upwardly and are secured at their upper end to a circular filling cam 330.

Referring to Figs. 14 and 15, the filler is operated, as distinguished from regulated, by a standard A. C. motor 332 which drives a reducer 333 affixed to a lower frame member 334. The output shaft 335 of the reducer extends vertically, supported by a pillow block 336 affixed to the frame 320, and has affixed to the upper end a spur gear 337 which drives a ring gear 338 affixed to a circular charge platform 340. The charge platform rotates around a center post 341 and has a raised edge 342 to form a hopper into which dry fluent material may be supplied from a charge chute 343.

When the charge platform is rotated in the direction shown in Fig. 14, the material deposited from the charge hopper 343 is carried around and over the entry slots 344 of the plurality of feed tubes 345. A "dam" or stop is provided in the form of the curved scraper 346 which is affixed by a clamp 347 to the center post 341.

The packages are carried empty to the filler 310 by a conveyor 349. As the circular charge platform rotates, the lower end of a feed tube is automatically inserted into the open end of an unfilled package which is then started on a circular filling cam 330. The cam determines the relative distance between the bottom of each box and the lower end of a feed tube and thus determines the amount of fluent material charged into each package at any given station. Thus, the portion of the cam indicated at 350 is a sharp incline. At point 351 the cam is the highest, that is, the bottom of a box is at its closest distance to the bottom of a feed tube. As it continues around beneath the feed tubes (see Fig. 11), the cam is inclined gradually downward, with a series of sharp drops or steps provided at points 352, 353, and 354, to "settle" or pad down the fluent material in a package before discharge on to the conveyor 312.

To vary the volumetric rate of filling, the relative distance at any point between the bottom of a package and the lower end of a feed tube is changed. In the filler 310, this is accomplished by varying the height of the cam 330, by actuting the motor 314 as described above. It is thus apparent that the filler will quickly react to either "increase" or "decrease" signals from the correction circuit 280.

What is claimed is:

1. An apparatus for detecting and correcting weight deficiencies in packages of a fluent material comprising, in combination, a scale means, means for transferring packages onto and off said scale means, electrical sensing means responsive to deflection of said scale means so as to signal the presence of packages having a relatively small weight deficiency and packages having a weight deficiency below a predetermined minimum, electrical means responsive to packages having any weight deficiency as signalled by said sensing means for correcting said weight deficiency, and electrical reject means responsive to packages having a weight deficiency below a predetermined minimum as signalled by said sensing means.

2. An apparatus for detecting and correcting weight deficiencies in packages of a fluent material comprising, in combination, a scale means, means for transferring successive packages onto and off said scale means, electrical sensing means including a pair of light source-photoelectric cell combinations responsive to deflection of said scale means so as to signal the presence of packages having a relatively small weight deficiency and packages having a weight deficiency below a predetermined minimum, electrical correction means responsive to packages having any weight deficiency as signalled by said sensing means for correcting said weight deficiency, and electrical reject means responsive to packages having a weight deficiency below a predetermined minimum as signalled by said sensing means.

3. Apparatus for detecting and correcting weight deficiencies in packages of fluent material comprising, a scale beam, means for conveying said packages from a filling station onto the scale beam and away from the scale beam, electrical sensing means responsive to deflection of said scale beam for signalling only the presence of lightweight packages, electrical means responsive to signals caused by packages having any deficiency in weight for transmitting a correction signal to the filling station, means for rejecting packages from the conveying means, and electrical means responsive to said signals caused by packages having a weight deficiency below a predetermined minimum for controlling said reject means.

4. Apparatus for detecting and correcting weight deficiencies in packages of fluent material comprising a scale beam, means for conveying packages from a filling station to said scale beam, means for transferring packages onto and off said scale beam, electrical sensing means responsive to deflection of said scale beam for signalling only the presence of lightweight packaegs, electrical means responsive to signals caused by packages having any deficiency in weight for transmitting a correction signal to the filling station, means for rejecting packages from the conveying means, and electrical means responsive to said signals caused by packages having a weight deficiency below a predetermined minimum for controlling said reject means.

5. Apparatus for detecting and correcting weight deficiencies in packages of fluent material comprising, a scale beam, means for conveying said packages from a filling station onto the scale beam and away from the scale beam, electrical sensing means responsive to deflection of said scale beam for signalling only the presence of lightweight packages, electrical means responsive to signals caused by packages having any deficiency in weight for transmitting a correction signal to the filling station, electrical means responsive to the absence of a signal during a predetermined time interval from said sensing means, for transmitting a correction signal to the filling station, means for rejecting packages from the conveying means, and electrical means responsive to said signals caused by packages having a weight deficiency below a predetermined minimum for controlling said reject means.

6. Apparatus for detecting and correcting weight deficiencies in packages of fluent material comprising a scale beam, means for conveying packages from a filling station to said scale beam, means for transferring packages onto and off said scale beam, electrical sensing means including a pair of light-source-photoelectric cell combinations responsive to deflection of said scale beam for signalling only the presence of packages having a relatively small weight deficiency and packages having a weight deficiency below a predetermined minimum, electrical means responsive to signals caused by packages having any deficiency in weight for transmitting a correction signal to the filling station, means for rejecting packages from the conveying means, and electrical means responsive to said signals caused by packages having a weight deficiency below a predetermined minimum for controlling said reject means.

7. An apparatus for detecting and correcting weight deficiencies in packages of a fluent material comprising, in combination, a scale means, means for transferring successive packages onto and off said scale means, electrical sensing means including a pair of light source-photoelectric cell combinations responsive to deflection of said scale means so as to signal the presence on said scale means of packages having a relatively small weight deficiency and packages having a weight deficiency below a predetermined minimum, an electrical correction means including means responsive to the presence of a preselected number of weight deficient packages in a predetermined series of packages transferred onto said scale means as signalled by said sensing means, and electrical reject means responsive to packages having a weight deficiency below a predetermined minimum as signalled by said sensing means.

8. An apparatus for detecting and correcting weight deficiencies in packages of a fluent material comprising, in combination, a scale means, means for transferring successive packages onto and off said scale means, electrical sensing means including a pair of light source-photoelectric cell combinations responsive to deflection of said scale means so as to signal the presence on said scale means of packages having a relatively small weight deficiency and packages having a weight deficiency below a predetermined minimum, an electrical correction means including means responsive to the presence of at least three weight deficient packages for each five successive packages transferred onto said scale means as signalled by said sensing means, and electrical reject means responsive to packages having a weight deficiency below a predetermined minimum as signalled by said sensing means.

9. An apparatus for detecting and correcting weight deficiencies in packages of a fluent material comprising, in combination, a scale means, means for transferring successive packages onto and off said scale means, electrical sensing means including a pair of light source-photoelectric cell combinations responsive to deflection of said scale means so as to signal the presence of packages having a relatively small weight deficiency and packages having a weight deficiency below a predetermined minimum, an electrical reject means responsive to packages having a weight deficiency below a predetermined minimum as signalled by said sensing means, and an electrical weight deficiency correction means including an actuating means which is energized for an adjustable period of time when the presence of a weight deficient package on said scale means is signalled by said sensing means, said correction means further including a means actuated by said reject means so as to cause the actuating means to be reenergized for an additional period of time.

10. An apparatus for detecting and correcting weight deficiencies in packages of a fluent material comprising, in combination a scale means, means for transferring successive packages onto and off said scale means, electrical sensing means including a pair of light source-photoelectric cell combinations responsive to deflection of said scale means so as to signal the presence of packages having a relatively small weight deficiency and packages having a weight deficiency below a predetermined minimum, an electrical reject means responsive to packages having a weight deficiency below a predetermined minimum as signalled by said sensing means, and an electrical weight deficiency correction means including an actuating means which is energized for an adjustable period of time when the presence of at least three weight deficient packages for each five successive packages transferred onto said scale means is signalled by said sensing means, said correction means further including a means actuated by said reject means so as to cause the actuating means to be reenergized for an additional period of time.

11. An apparatus for detecting and correcting weight deficiencies in packages of a fluent material comprising, in combination, a frame, an intake conveyor means mounted atop said frame, a discharge conveyor means mounted atop said frame, a scale means located atop said frame between said intake and discharge conveyor means, a package pusher means located on said frame for transferring packages laterally from said intake conveyor means onto said scale means, a package aligning means mounted atop said frame for positioning packages on said scale means, and electrical sensing means responsive to deflection of said scale means for transmitting a weight deficiency correction signal.

12. An apparatus for detecting and correcting weight deficiencies in packages of a fluent material comprising, in combination, a frame, a drive means located within said frame, an intake conveyor means mounted atop said frame and driven from said drive means, a discharge conveyor means mounted atop said frame and driven from said drive means, scale means between said conveyors, a package pusher means located on said frame and driven by said drive means for transferring packages laterally from said intake conveyor means onto said scale means, a package aligning means mounted on said frame and driven by said drive means for positioning packages on said scale means, and electrical sensing means responsive to deflection of said scale means for transmitting a weight deficiency correction signal.

13. An apparatus for detecting and correcting weight deficiencies in packages of a fluent material comprising, in combination, a frame, a drive means located within said frame, an intake conveyor means mounted atop said frame and driven from said drive means, a discharge conveyor means mounted atop said frame and driven from said drive means, scale beam locking means driven from said drive means, a package pusher means mounted on said frame, driven from said drive means and operating laterally above said intake conveyor means, a package aligning means mounted atop said frame, driven from said drive means and operating above said discharge conveyor means, a scale beam mounted atop said frame and between said intake and discharge conveyor means, the operation of said scale beam being controlled by said beam locking means, and electrical means consisting of a pair of light source-photoelectric cell combinations for sensing deflection of said scale beam.

14. An apparatus for detecting and correcting weight deficiencies in packages of a fluent material comprising, in combination, a frame, a drive means located within said frame, an intake conveyor means mounted atop said frame and driven from said drive means, a discharge conveyor means mounted atop said frame and driven from said drive means, scale beam locking means driven from said drive means, a package pusher means mounted on said frame, driven from said drive means and operating laterally above said intake conveyor means, a package aligning means mounted atop said frame, driven from said drive means and operating above said discharge conveyor means, a scale beam, mounted atop said frame and between said intake and discharge conveyor means, the operation of said scale beam being controlled by said beam locking means, electrical sensing means responsive to deflection of said scale beam so as to signal the presence of packages having a relatively small weight deficiency and packages having a weight deficiency below a predetermined minimum, electrical means responsive to packages having any weight deficiency as signalled by said sensing means for correcting said weight deficiency, and electrical reject means, including means connected to said discharge conveyor means, responsive to packages having a weight deficiency below a predetermined minimum as signalled by said sensing means.

15. An apparatus for detecting and correcting weight deficiencies in packages of a fluent material comprising, in combination, a frame, a drive means located within said frame, an intake conveyor means mounted atop said frame and driven from said drive means, a discharge conveyor means mounted atop said frame and driven from said drive means, scale beam locking means driven from said drive means, a package pusher means mounted on said frame, driven from said drive means and operating laterally above said intake conveyor means, a package aligning means mounted atop said frame, driven from said drive means and operating above said discharge conveyor means, a scale beam, mounted atop said frame and between said intake and discharge conveyor means, the operation of said scale beam being controlled by said beam locking means, electrical sensing means responsive to deflection of said scale beam so as to signal the presence of packages having a relatively small weight deficiency and packages having a weight deficiency below a predetermined minimum, electrical means responsive to the presence of a preselected number of weight deficient packages in a predetermined series of packages transferred onto said scale means as signalled by said sensing means, and electrical reject means, including means connected to said discharge conveyor means, responsive to the presence of packages having a weight deficiency below a predetermined minimum as signalled by said sensing means.

16. An apparatus for detecting and correcting weight deficiencies in packages of a fluent material comprising, in combination, a frame, a drive means located within said frame, an intake conveyor means mounted atop said frame and driven from said drive means, a discharge conveyor means mounted atop said frame and driven from said drive means, a scale beam locking means driven from said drive means, a package pusher means mounted on said frame, driven from said drive means and operating laterally above said intake conveyor means, a package aligning means mounted atop said frame, driven from said drive means and operating above said discharge conveyor means, a scale beam, mounted atop said frame and between said intake and discharge conveyor means, the operation of said scale beam being controlled by said beam locking means, electrical sensing means responsive to deflection of said scale beam so as to signal the presence of packages having a relatively small weight deficiency and packages having a weight deficiency below a predetermined minimum, electrical correction means responsive to the presence of at least three weight deficient packages for each five successive packages transferred onto said scale means as signalled by said sensing means, and electrical reject means, including means connected to said discharge conveyor means, responsive to the presence of packages having a weight deficiency below a predetermined minimum as signalled by said sensing means.

17. An apparatus for detecting and correcting weight deficiencies in packages of a fluent material comprising, in combination, a scale beam for weighing said packages, a gravity hammer movably mounted on said beam for increasing the rate of deflection of the scale beam toward the equilibrium position in the unbalanced condition when a package is weighed, means for transferring packages onto and off said scale means, and sensing means responsive to deflection of said scale means.

18. An apparatus for detecting and correcting weight deficiencies in packages of a fluent material comprising, in combination, a scale means for weighing said packages, said scale means including a scale beam and beam locking and releasing means, a gravity operated hammer movably mounted on said beam for increasing the rate of deflection of the scale means toward the equilibrium position in the unbalanced condition when the scale beam is released, means for transferring packages onto and off said scale means, and sensing means responsive to deflection of said scale means.

19. An apparatus for detecting and correcting weight deficiencies in packages of a fluent material comprising, in combination, a scale means for weighing said packages, said scale means including a scale beam and beam locking means, said scale beam having a gravity operated hammer pivotally affixed thereto so as to increase the rate of deflection of the scale beam toward the equilibrium position in the unbalanced condition when the scale beam is unlocked, means for transferring packages onto and off said scale means, and sensing means responsive to deflection of said scale means.

20. In combination with an apparatus for filling packages with a fluent material, an apparatus for detecting and correcting weight deficiencies in said packages comprising, a scale means, means for transferring packages onto and off said scale means, electrical sensing means responsive to deflection of said scale means so as to signal only the presence of packages having a relatively small weight deficiency and packages having a weight deficiency below a predetermined minimum, electrical correction means controlling said filling apparatus, responsive to packages having any weight deficiency as signalled by said sensing means, and electrical reject means responsive to packages having a weight deficiency below a predetermined minimum as signalled by said sensing means.

21. In combination with an apparatus for filling packages with a fluent material, an apparatus for detecting and correcting weight deficiencies in said packages comprising, a scale means, means for transferring successive packages onto and off said scale means, electrical sensing means including a pair of light source photoelectric cell combinations responsive to deflection of said scale means so as to signal only the presence of packages having a relatively small weight deficiency and packages having a weight deficiency below a predetermined minimum, electrical correction means controlling said filling apparatus, responsive to packages having any weight deficiency as signalled by said sensing means, and electrical reject means responsive to packages having a weight deficiency below a predetermined minimum as signalled by said sensing means.

22. In combination with an apparatus for filling packages with a fluent material, said filling apparatus having an adjusting means, an apparatus for detecting and correcting weight deficiencies in said packages comprising a scale means, means for transferring successive packages onto and off said scale means, electrical sensing means including a pair of light source photoelectric cell combinations responsive to deflection of said scale means so as to signal only the presence of packages having a relatively small weight deficiency and packages having a weight deficiency below a predetermined minimum, an electrical correction means connected to said filling apparatus and including means for actuating said adjusting means so as to decrease the amount of material filled into each package on the filling apparatus in the absence of a signal from the sensing means indicating the presence of a weight deficient package on the scale means, and electrical reject means responsive to packages having a weight deficiency below a predetermined minimum as signalled by said sensing means.

23. In combination with an apparatus for filling packages with a fluent material, said filling apparatus having an adjusting means, an apparatus for detecting and correcting weight deficiencies in said packages comprising, a scale means, means for transferring successive packages onto and off said scale means, electrical sensing means including a pair of light source photoelectric cell combinations responsive to deflection of said scale means so as to signal only the presence of packages having a relatively small weight deficiency and packages having a weight deficiency below a predetermined minimum, an electrical correction means connected to said filling apparatus and including means for actuating said adjusting means so as to increase the amount of material filled into each package when the presence of a weight deficient package on the scale means is signalled by said sensing means, and electrical reject means responsive to packages having a weight deficiency below a predetermined minimum as signalled by said sensing means.

24. In combination with an apparatus for filling packages with a fluent material, said filling apparatus having an adjusting means, an apparatus for detecting and correcting weight deficiencies in said packages comprising, a scale means, means for transferring at least five packages in succession onto and off said scale means, electrical sensing means including a pair of light source-photoelectric cell combinations responsive to each package in succession so as to signal only the presence on said scale means of packages having a relatively small weight deficiency and packages having a weight deficiency below a predetermined minimum, an electrical correction means connected to said filling apparatus and including means for actuating said adjusting means so as to decrease the amount of material filled into each package when the presence of not more than two weight deficient packages for each five packages transferred onto said scale means has been signalled by said sensing means, and electrical reject means responsive to packages having a weight deficiency below a predetermined minimum as signalled by said sensing means.

25. In combination with an apparatus for filling packages with a fluent material, said filling apparatus having an adjusting means, an apparatus for detecting and correcting weight deficiencies in said packages comprising, a scale means, means for transferring at least five packages in succession onto and off said scale means, electrical sensing means including a pair of light source-photoelectric cell combinations responsive to each package in succession so as to signal only the presence on said scale means of packages having a relatively small weight deficiency and packages having a weight deficiency below a predetermined minimum, an electrical correction means connected to said filling apparatus and including means for actuating said adjusting means so as to increase the amount of material filled into each package when the presence of at least three weight deficient packages for each five packages transferred onto said scale means has been signalled by said sensing means, and electrical reject means responsive to packages having a weight deficiency below a predetermined minimum as signalled by said sensing means.

26. In combination with an apparatus for filling packages with a fluent material, said apparatus having an adjusting means, an apparatus for detecting and correcting weight deficiencies in said packages comprising, a scale means, means for transferring successive packages onto and off said scale means, an electrical sensing means including a pair of light source-photoelectric cell combinations responsive to deflection of said scale means so as to signal the presence of packages having a relatively small weight deficiency and packages having a weight deficiency below a predetermined minimum, an electrical correction means connected to said filling apparatus and including means for actuating said adjusting means so as to increase the amount of material filled into each package when the presence of a weight deficient package on the scale means is signalled by said sensing means and means to decrease the amount of material filled into each package in the absence of such a signal from said sensing means, and electrical reject means responsive to packages having a weight deficiency below a predetermined minimum as signalled by said sensing means.

27. In combination with an apparatus for filling packages with a fluent material, said apparatus having an adjusting means, an apparatus for detecting and correcting weight deficiencies in said packages comprising, a scale means, means for transferring successive packages onto and off said scale means, an electrical sensing means including a pair of light source-photoelectric cell combinations responsive to deflection of said scale means so as to signal the presence of packages having a relatively small weight deficiency and packages having a weight deficiency below a predetermined minimum, an electrical correction means connected to said filling apparatus and including means for actuating said adjusting means so as to increase the amount of material filled into each package when the presence of at least three weight deficient packages for each five packages transferred onto said scale means is signalled by said sensing means and means to decrease the amount of material filled into each package when the presence of not more than two weight deficient packages for each five packages transferred onto said scale means has been signalled by said sensing means, and electrical reject means responsive to packages having a weight deficiency below a predetermined minimum as signalled by said sensing means.

28. In combination with an apparatus for filling packages with a fluent material, said apparatus having an adjusting means, an apparatus for detecting and correcting weight deficiencies in said packages comprising, a scale means, means for transferring successive packages onto and off said scale means, an electrical sensing means including a pair of light source-photoelectric cell combinations responsive to deflection of said scale means so as to signal the presence of packages having a relatively small weight deficiency and packages having a weight deficiency below a predetermined minimum, an electrical reject means responsive to packages having a weight deficiency below a predetermined minimum as signalled by said sensing means, and an electrical correction means connected to said filling apparatus and including means for actuating said filler adjusting means for an adjustable period of time so as to increase the amount of material filled into each package when the presence of a weight deficient package on the scale means has been signalled by said sensing means, said correction means further including a means actuated by said reject means so as to cause the actuating means to actuate said filler adjusting means for an additional period of time.

29. In combination with an apparatus for filling packages with a fluent material, said apparatus having an adjusting means, an apparatus for detecting and correcting weight deficiencies in said packages comprising, a scale means, means for transferring successive packages onto and off said scale means, an electrical sensing means including a pair of light source-photoelectric cell combinations responsive to deflection of said scale means so as to signal the presence of packages having a relatively small weight deficiency and packages having a weight deficiency below a predetermined minimum, an electrical reject means responsive to packages having a weight deficiency below a predetermined minimum as signalled by said sensing means, and an electrical correction means connected to said filling apparatus and including means for actuating said filler adjusting means for an adjustable period of time so as to increase the amount of material filled into each package when the presence of at least three weight deficient packages for each five packages transferred onto said scale means has been signalled by said sensing means, said correction means further including a means actuated by said reject means so as to cause the actuating means to actuate said filler adjusting means for an additional period of time.

30. In combination with an apparatus for filling packages with a fluent material, an apparatus for detecting and correcting weight deficiencies in said packages comprising, a frame, an intake conveyor means mounted atop said frame, a discharge conveyor means mounted atop said frame, a scale means located atop said frame between said intake and discharge conveyor means, a package pusher means for transferring packages laterally from said intake conveyor to said scale means, and thence to said discharge conveyor, a package aligning means for positioning packages on said scale means, electrical sensing means responsive to deflection of said scale means so as to signal the presence of packages having a weight deficiency, and electrical correction means responsive to any weight deficiency as signalled by said sensing means and controlling said filling apparatus.

31. In combination with an apparatus for filling packages with a fluent material, an apparatus for detecting and correcting weight deficiencies in said packages comprising, a frame, a drive means mounted on said frame, an intake conveyor means mounted on said frame and driven from said drive means, a discharge conveyor means mounted on said frame and driven from said drive means, scale means between said conveyors, a package pusher means from said drive means, for transferring packages laterally from said intake conveyor to said scale means and thence to said discharge conveyor, a package aligning means mounted on said frame and driven by said drive means for positioning packages on said scale means, electrical sensing means responsive to deflection of said scale means so as to signal the presence of packages having a weight deficiency, and electrical correction means, responsive to any weight deficiency as signalled by said sensing means and controlling said filling apparatus.

32. In combination with an apparatus for filling packages with a fluent material, an apparatus for detecting and correcting weight deficiencies in said packages comprising, a frame, a drive means mounted on said frame, an intake conveyor means mounted on said frame and driven from said drive means, a discharge conveyor means mounted on said frame and driven from said drive means, a scale beam locking means operatively connected to said drive means, a package pusher means driven from said drive means and operating laterally above said intake conveyor means, a package aligning means driven from said drive means and operating above said discharge conveyor means, a scale means, including a scale beam, mounted between said intake and discharge conveyor means, the operation of said scale means being controlled by said beam locking means, electrical means consisting of a pair of light source-photoelectric cell combinations for sensing deflection of said scale beam so as to signal the presence of packages having a weight deficiency, and electrical correction means, responsive to any weight deficiency as signalled by said sensing means and controlling said filling apparatus.

33. In combination with an apparatus for filling packages with a fluent material, an apparatus for detecting and correcting weight deficiencies in said packages comprising, a frame, a drive means mounted on said frame, an intake conveyor means mounted on said frame and driven from said drive means, a discharge conveyor means mounted on said frame and driven from said drive means, a scale beam locking means operatively connected to said drive means, a package pusher means driven from said drive means and operating laterally above said intake conveyor means, a package aligning means driven from said drive means and operating above said discharge conveyor means, a scale means, including a scale beam, mounted between said intake and discharge conveyor means, the operation of said scale means being controlled by said beam locking means, electrical sensing means responsive to deflection of said scale beam so as to signal the presence of packages having a relatively small weight deficiency and packages having a weight deficiency below a predetermined minimum, electrical correction means, responsive to any weight deficiency as signalled by said sensing means and controlling said apparatus, and electrical reject means, including means connected to said discharge conveyor means, responsive to packages having a weight deficiency below a predetermined minimum as signalled by said sensing means.

34. In combination with an apparatus for filling packages with a fluent material, said filling apparatus having an adjusting means, an apparatus for detecting and correcting weight deficiencies in said packages comprising, a frame, a drive means mounted on said frame, an intake conveyor means mounted on said frame and driven from said drive means, a discharge conveyor means mounted on said frame and driven from said drive means, a scale beam locking means operatively connected to said drive means, a package pusher means driven from said drive means and operating laterally above said intake conveyor means, a package aligning means mounted atop said frame, driven from said drive means and operating above said discharge conveyor means, a scale means, including a scale beam, mounted between said intake and discharge conveyor means, the operation of said scale means being controlled by said beam locking means, electrical sensing means responsive to deflection of said scale beam so as to signal the presence of packages having a relatively small weight deficiency and packages having a weight deficiency below a predetermined minimum, electrical correction means including means for actuating said filler so as to decrease the amount of material filled into each package when the presence of not more than two weight deficient packages for each five packages transferred onto said scale means has been signalled by said sensing means, and electrical reject means, including means connected to said discharge conveyor means, responsive to the presence of packages having a weight deficiency below a predetermined minimum as signalled by said sensing means.

35. In combination with an apparatus for filling packages with a fluent material, said filling apparatus having an adjusting means, an apparatus for detecting and correcting weight deficiencies in said packages comprising, a frame, a drive means mounted on said frame, an intake conveyor means mounted on said frame and driven from said drive means, a discharge conveyor means mounted on said frame and driven from said drive means, a scale beam locking means operatively connected to said drive means, a package pusher means driven from said drive means and operating laterally above said intake conveyor means, a package aligning means driven from said drive means and operating above said discharge conveyor means, a scale means, including a scale beam, mounted between said intake and discharge conveyor means, the operation of said scale means being controlled by said beam locking means, electrical sensing means responsive to deflection of said scale beam so as to signal the presence of packages having a relatively small weight deficiency and packages having a weight deficiency below a predetermined minimum, electrical correction means including means for actuating the filling apparatus so as to increase the amount of material filled into each package when the presence of at least three weight deficient packages for each five successive packages transferred onto said scale means has been signalled by said sensing means, and electrical reject means, including means connected to said discharge conveyor means, responsive to the presence of packages having a weight deficiency below a predetermined minimum as signalled by said sensing means.

36. In combination with an apparatus for filling packages with a fluent material, an apparatus for detecting and correcting weight deficiencies in said packages comprising a scale means for weighing said packages, a gravity hammer movably attached to the scale means for increasing the rate of deflection of the scale means toward the equilibrium position in the unbalanced condition when a package is weighed, sensing means responsive to deflection of said scale means so as to signal the presence of packages having a relatively small weight deficiency and packages having a weight deficiency in excess of a predetermined minimum, electrical correction means, responsive to any weight deficiency as signalled by said sensing means and controlling said filling apparatus, and electrical reject means responsive to packages having a weight deficiency in excess of a predetermined minimum as signalled by said sensing means.

37. In combination with an apparatus for filling packages with a fluent material, an apparatus for detecting and correcting weight deficiencies in said packages comprising, a scale beam for weighing said packages, means for locking and releasing said beam, a gravity operated hammer on said beam for increasing the rate of deflection of the scale beam in released position toward the equilibrium position in the unbalanced condition when the scale means is actuated, sensing means responsive to deflection of said scale means to signal the presence of packages having a relatively small weight deficiency and packages having a weight deficiency in excess of a predetermined minimum, electrical correction means, responsive to any weight deficiency as signalled by said sensing means and controlling the filling apparatus, and electrical reject means responsive to packages having a weight deficiency in excess of a predetermined minimum as signalled by said sensing means.

38. In combination with an apparatus for filling packages with a fluent material, an apparatus for detecting and correcting weight deficiencies in said packages comprising, a scale means for weighing said packages, said scale means including a locking means and a scale beam, a gravity operated hammer pivotally affixed to said beam so as to increase the rate of deflection of the scale beam toward the equilibrium position in the unbalanced condition when the scale beam is unlocked, sensing means responsive to deflection of said scale means so as to signal the presence of packages having a relatively small weight deficiency and packages having a weight deficiency in excess of a predetermined minimum, electrical correction means, responsive to any weight deficiency as signalled by said sensing means and controlling said filling apparatus, and electrical reject means responsive to packages having a weight deficiency in excess of a predetermined minimum as signalled by said sensing means.

39. In a process wherein a succession of packages are each filled with a predetermined volume of fluent material by means of a filling apparatus and it is required that each filled package have a weight in excess of a predetermined minimum, a method of detecting deficiencies in the weight of said packages comprising the steps of, weighing each of said succession of filled packages, sensing only the presence of lightweight packages having either a relatively small weight deficiency or a weight deficiency below said predetermined minimum, rejecting each of said packages having a weight deficiency below a predetermined minimum, and electrically signalling the presence of a preselected number of weighed packages, having any weight deficiency, in a succession of a predetermined number of said packages.

40. In a process wherein a succession of packages are each filled with a predetermined volume of fluent material by means of a filling apparatus and it is required that each filled package have a weight in excess of a predetermined minimum, a method of detecting and correcting deficiencies in the weight of said packages comprising the steps of, weighing each of said succession of filled packages, sensing only the presence of lightweight packages having either a relatively small weight deficiency or a weight deficiency below said predetermined minimum, rejecting each of said packages having a weight deficiency below said predetermined minimum, electrically signalling to said filling apparatus the presence of a pre-selected number of weighed packages, having any weight deficiency, in a succession of a predetermined number of said packages, and electrically controlling said filling apparatus by said signal to correct said deficiency.

References Cited in the file of this patent

UNITED STATES PATENTS

| | | |
|---|---|---|
| 2,116,895 | Howard | May 10, 1938 |
| 2,354,087 | Raymer | July 18, 1944 |
| 2,462,286 | Rhodes | Feb. 22, 1949 |
| 2,712,408 | Weber | July 5, 1955 |
| 2,726,061 | Schieser et al. | Dec. 6, 1955 |